US012227968B2

(12) United States Patent
Lv et al.

(10) Patent No.: US 12,227,968 B2
(45) Date of Patent: Feb. 18, 2025

(54) SMART LOCK AND METHOD FOR AUTOMATICALLY LOCKING SMART LOCK

(71) Applicant: YUNDING NETWORK TECHNOLOGY (BEIJING) CO., LTD., Beijing (CN)

(72) Inventors: Yanpeng Lv, Beijing (CN); Wenfeng Li, Beijing (CN); Tao Li, Beijing (CN); Hao Tang, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 295 days.

(21) Appl. No.: 18/054,885

(22) Filed: Nov. 11, 2022

(65) Prior Publication Data

US 2023/0072967 A1 Mar. 9, 2023

Related U.S. Application Data

(63) Continuation-in-part of application No. 17/451,873, filed on Oct. 22, 2021, now abandoned, which is a (Continued)

(30) Foreign Application Priority Data

Sep. 21, 2017 (CN) ......................... 201710858044.1
Apr. 24, 2019 (CN) ......................... 201910333439.9
Apr. 24, 2019 (CN) ......................... 201910333750.3

(51) Int. Cl.
*E05B 45/06* (2006.01)
*G07C 9/00* (2020.01)

(52) U.S. Cl.
CPC ........ *E05B 45/061* (2013.01); *G07C 9/00817* (2013.01); *G07C 2009/00825* (2013.01)

(58) Field of Classification Search
CPC ................ G06F 21/46; G07C 9/00817; G07C 2009/00825; G07C 9/00563;
(Continued)

(56) References Cited

U.S. PATENT DOCUMENTS 9,528,299 B2 12/2016 Yoon et al.
9,659,422 B2 5/2017 Lovelock et al.
(Continued)

FOREIGN PATENT DOCUMENTS

CN 2692283 Y 4/2005
CN 200949351 Y 9/2007
(Continued)

OTHER PUBLICATIONS

International Search Report in PCT/CN2018/106663 mailed on Dec. 27, 2018, 7 pages.
(Continued)

*Primary Examiner* — Sisay Yacob
(74) *Attorney, Agent, or Firm* — METIS IP LLC

(57) ABSTRACT

The present disclosure provides a smart door lock and a method for controlling the smart door lock. The method may be implemented on a computing apparatus including a processor and a storage device. The method may include obtaining user information and determining whether the user information passes a verification. The method may further include in response to a determination that the user information passes the verification, controlling the smart door lock to perform an unlock operation. The method may further include determining whether the door on which the smart door lock is installed has a preset action within a preset time period and in response to a determination that the door has the preset action within the preset time period, controlling at least one component of the smart door lock to perform at least one operation.

20 Claims, 14 Drawing Sheets

Related U.S. Application Data continuation-in-part of application No. PCT/CN2020/086661, filed on Apr. 24, 2020, and a continuation-in-part of application No. 16/826,182, filed on Mar. 21, 2020, now Pat. No. 11,527,118, which is a continuation of application No. PCT/CN2018/106663, filed on Sep. 20, 2018.

(58) Field of Classification Search

CPC .............. G07C 9/00174; G07C 9/0069; G07C 2209/08; G07C 9/00; E05B 45/061; E05B 47/0002; E05B 47/026; E05B 47/0676; E05B 63/146; E05B 2035/009; E05B 2047/0067; E05B 47/0012; E05B 3/00; E05B 15/00; E05B 2047/0026

See application file for complete search history.

(56) References Cited

U.S. PATENT DOCUMENTS

| | | | | |
|---|---|---|---|---|
| 9,982,460 | B2 | 5/2018 | Takada | |
| 10,140,828 | B2 | 11/2018 | Johnson et al. | |
| 2003/0231103 | A1* | 12/2003 | Fisher | G07C 9/00912 340/5.73 |
| 2004/0119617 | A1 | 6/2004 | Brown et al. | |
| 2007/0164848 | A1 | 7/2007 | Kim | |
| 2009/0271580 | A1* | 10/2009 | Oe | G06F 21/552 711/E12.001 |
| 2013/0293368 | A1 | 11/2013 | Ottah et al. | |
| 2015/0028995 | A1 | 1/2015 | Gautama et al. | |
| 2015/0128667 | A1 | 5/2015 | Yoon et al. | |
| 2016/0343217 | A1 | 11/2016 | Loidreau et al. | |
| 2017/0328086 | A1 | 11/2017 | Takada | |
| 2018/0044942 | A1* | 2/2018 | Li | E05B 47/00 |
| 2020/0123808 | A1 | 4/2020 | Lovejoy et al. | |
| 2020/0219347 | A1* | 7/2020 | Lv | E05B 47/0002 |
| 2020/0372738 | A1* | 11/2020 | Singh | G07C 9/00674 |
| 2022/0130193 | A1* | 4/2022 | Singh | H04N 7/147 |
| 2022/0292897 | A1* | 9/2022 | Newcomb | G07C 9/215 |

FOREIGN PATENT DOCUMENTS

| | | | |
|---|---|---|---|
| CN | 101532354 | A | 9/2009 |
| CN | 101672913 | A | 3/2010 |
| CN | 102121827 | A | 7/2011 |
| CN | 202266094 | U | 6/2012 |
| CN | 202831874 | U | 3/2013 |
| CN | 203008567 | U | 6/2013 |
| CN | 104200593 | A | 12/2014 |
| CN | 104790786 | A | 7/2015 |
| CN | 105225316 | A | 1/2016 |
| CN | 106097527 | A | 11/2016 |
| CN | 106817494 | A | 6/2017 |
| CN | 107060521 | A | 8/2017 |
| CN | 107462148 | A | 12/2017 |
| CN | 107492189 | A | 12/2017 |
| CN | 107733994 | A | 2/2018 |
| CN | 207392926 | U | 5/2018 |
| CN | 108154017 | A | 6/2018 |
| CN | 108179925 | A | 6/2018 |
| CN | 108898725 | A | 11/2018 |
| CN | 109039595 | A | 12/2018 |
| CN | 109102607 | A | 12/2018 |
| CN | 109410410 | A | 3/2019 |
| CN | 109493464 | A | 3/2019 |
| CN | 109509283 | A | 3/2019 |
| CN | 109559415 | A | 4/2019 |
| CN | 209401085 | U | 9/2019 |
| DE | 20306883 | U1 | 9/2003 |
| EP | 2288101 | B1 | 5/2016 |
| JP | 2014158222 | A | 8/2014 |
| JP | 2015104116 | A | 6/2015 |
| KR | 20180124654 | A | 11/2018 |
| WO | 2018028129 | A1 | 2/2018 |

OTHER PUBLICATIONS

Written Opinion in PCT/CN2018/106663 mailed on Dec. 27, 2018, 10 pages.

First Office Action in Chinese Application No. 201710858044.1 mailed on Jun. 15, 2022, 11 pages.

First Office Action in Chinese Application No. 202010204508.9 mailed on Oct. 10, 2022, 18 pages.

The Second Office Action in Chinese Application No. 201710858044.1 mailed on Nov. 18, 2022, 19 pages.

International Search Report in PCT/CN2020/086661 mailed on Jul. 22, 2020, 6 pages.

Written Opinion in PCT/CN2020/086661 mailed on Jul. 22, 2020, 7 pages.

First Office Action in Chinese Application No. 201910333750.3 mailed on Mar. 3, 2021, 29 pages.

* cited by examiner

SMART LOCK AND METHOD FOR AUTOMATICALLY LOCKING SMART LOCK

CROSS-REFERENCE TO RELATED APPLICATIONS

The present application is a continuation-in-part of U.S. patent application Ser. No. 16/826,182, filed on Mar. 21, 2020, which is a continuation of International Application No. PCT/CN2018/106663 filed on Sep. 20, 2018, which claims priority to Chinese Patent Application No. 201710858044.1, filed on Sep. 21, 2017. The present application is also a continuation-in-part of U.S. patent application Ser. No. 17/451,873, filed on Oct. 22, 2021, which is a continuation-in-part of International Application No. PCT/CN2020/086661, filed on Apr. 24, 2020, which claims priority to Chinese Patent Application No. 201910333750.3, filed on Apr. 24, 2019, and Chinese Patent Application No. 201910333439.9, filed on Apr. 24, 2019. The entire contents of all the above applications are hereby incorporated by reference.

TECHNICAL FIELD

The present disclosure generally relates to the technical field of security, and more particular, to a smart door lock and a method for automatically locking (and/or unlocking) the smart door lock.

BACKGROUND

With the fast development of door lock technology, the smart door lock has become increasingly popular and useful in daily lives due to its safety and convenience. Conventionally, after a user passes a verification, the smart door lock is unlocked. The user may then open the door and enter the room, and the smart door lock may be automatically locked after a preset period of time (e.g., 5 seconds). However, a user may spend only 3 seconds entering the room and the door remains in an unlocked state during the remaining 2 seconds. As anyone can enter the room during these 2 seconds without a verification, such smart door lock contains high security risks. Therefore, it is desired to provide a smart door lock and a method for automatically locking the smart door lock immediately after the door is closed.

SUMMARY

According to an aspect of the present disclosure, a method for controlling a smart door lock is provided. The method may be implemented on a computing apparatus including a processor and a storage device. The method may include obtaining user information. The method may further include determining whether the user information passes a verification. The method may further include in response to a determination that the user information passes the verification, controlling the smart door lock to perform an unlock operation. The method may further include determining whether the door on which the smart door lock is installed has a preset action within a preset time period and in response to a determination that the door has the preset action within the preset time period, controlling at least one component of the smart door lock to perform at least one operation.

In some embodiments, the preset action may include at least one of an opening action, a closing action, or a holding action.

In some embodiments, the preset action may be an opening action or a closing action and the controlling at least one component of the smart door lock to perform at least one operation may include controlling the smart door lock to perform a lock operation.

In some embodiments, the preset action may be a holding action and the controlling at least one component of the smart door lock to perform at least one operation may include controlling at least one of the one or more sensors to enter a sleep mode or a low-power mode.

In some embodiments, the preset action may be a holding action and the controlling at least one component of the smart door lock to perform at least one operation may include controlling a communication module to generate a notification or an alarm.

In some embodiments, the determining whether the door on which the smart door lock is installed has a preset action within a preset time period may include acquiring, by one or more sensors, sensor information of the door and determining whether the door has the preset action within the preset time period according to the sensor information.

In some embodiments, the one or more sensors may include at least one of an infrared sensor, a reed sensor, a contact sensor, a gyroscope sensor, an accelerometer, a geomagnetic sensor, a visual sensor, or a pressure sensor.

In some embodiments, the sensor information may include at least one of a state of a latch bolt, a state of a dead bolt, a state of a lever handle base, a state of a contact sensor, an air pressure inside the door, an air pressure outside the door, an angular velocity of the door, an angle of the door, an acceleration of the door, a magnetic field of the door, or an image opposite to the door.

In some embodiments, the smart door lock may include a clutch device connected to a lever handle base and at least one of a latch bolt or a dead bolt, and the unlock operation may include disconnecting the clutch device from the lever handle base or the at least one of the latch bolt or the dead bolt.

In some embodiments, the smart door lock may not include a clutch device, and the unlock operation may include driving at least one of a latch bolt or a dead bolt to project.

According to another aspect of the present disclosure, a smart door lock is provided. The smart door lock may include an identification information verification module, a sensing module, and a processing module. The identification information verification module may be configured to obtain user information and determine whether the user information passes a verification. The sensing module may include one or more sensors. In response to a determination that the user information passes the verification, the processing module may be configured to control the smart door lock to perform an unlock operation. The processing module may further be configured to determine whether the door on which the smart door lock is installed has a preset action within a preset time period. In response to a determination that the door has the preset action within the preset time period, the processing module may be configured to control the smart door lock to perform at least one operation.

According to a further aspect of the present disclosure, a non-transitory readable medium is provided. The non-transitory readable medium may include at least one set of instructions. When executed by at least one processor, the at least one set of instructions may direct the at least one processor to perform a method. The method may include obtaining user information. The method may further include determining whether the user information passes a verification. In response to a determination that the user information passes the verification, the method may include controlling the smart door lock to perform an unlock operation. The method may further include determining whether the door on which the smart door lock is installed has a preset action within a preset time period. In response to a determination that the door has the preset action within the preset time period, the method may include controlling at least one component of the smart door lock to perform at least one operation.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
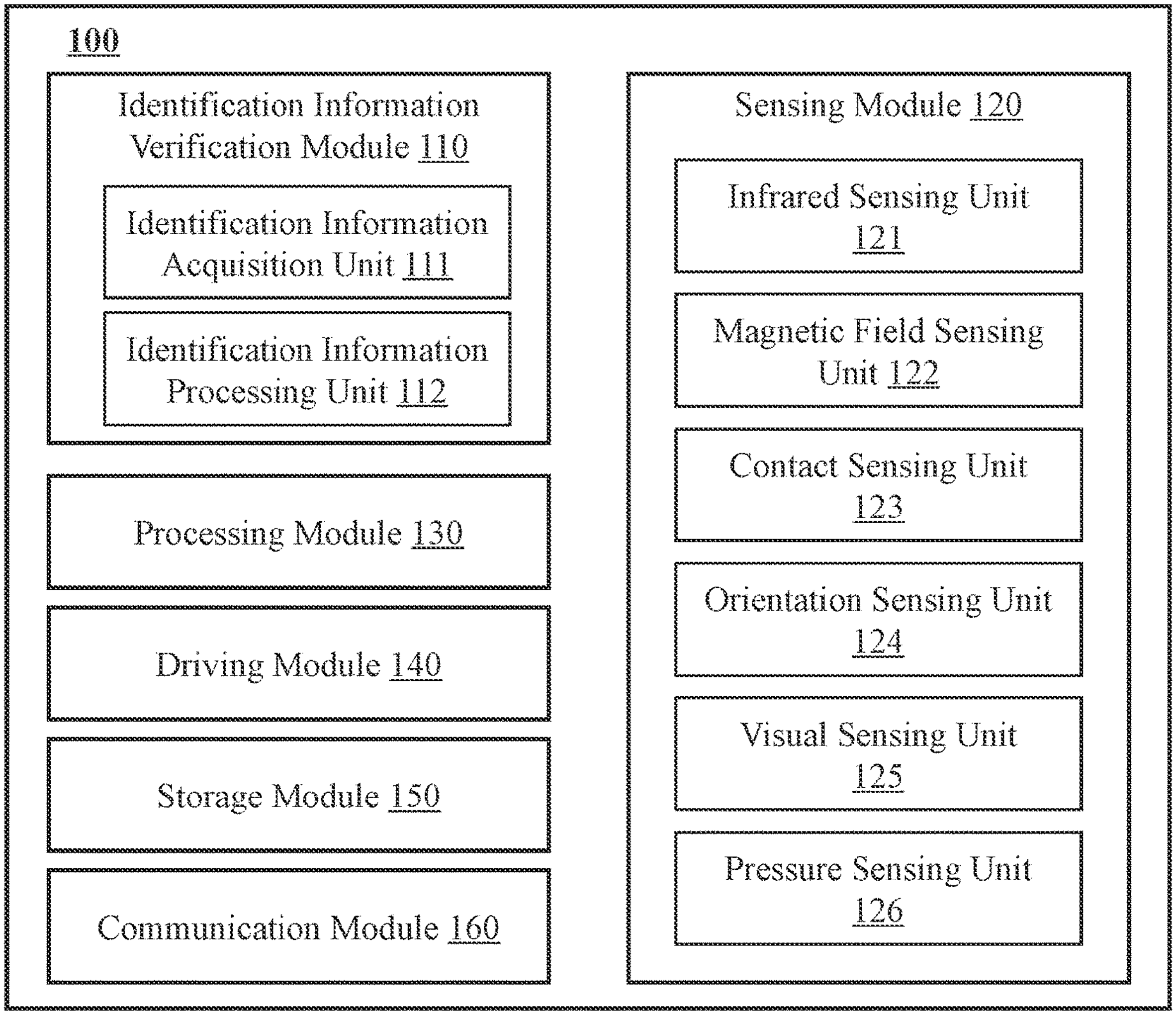
FIG. 1 is a block diagram illustrating an exemplary smart door lock according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

An aspect of the present application relates to a smart door lock (also referred to as a smart lock) and a method for automatically locking (and/or unlocking) the smart door lock. The present method for automatically locking the smart door lock may be applied in security fields such as home equipments and access control systems. In some embodiments, the method may include controlling the smart door lock to perform an unlocking operation when user information is verified. In some embodiments, the smart door lock may further determine whether the door on which the smart door lock is installed has a preset action within a preset time according to sensor information acquired by one or more sensors. In some embodiments, the smart door lock may control the smart door lock or at least one component thereof to perform at least one operation based on the determination result. In some embodiments, the at least one operation may include a locking operation, an unlocking operation, a notification generating operation, an alarm generating operation, etc. In some embodiments, the preset action of the door may include a door opening action, a door closing action, a door holding action, a door opening action followed by a door closing action, a door opening action followed by a door holding action, or the like. The present method may monitor the states and actions of the door in real time, and control the smart door lock or components thereof to take corresponding operations based on the states and actions of the door to improve the user's personal safety and property safety.

FIG. 1 is a block diagram illustrating an exemplary smart door lock 100 according to some embodiments of the present disclosure. The smart door lock 100 may be mounted on a door, such as on an outer surface of the door panel, on an inner surface of the door panel, inside the door panel, or the like. In some embodiments, if the smart door lock 100 is locked, the door may not be opened directly (e.g., cannot be opened without passing a verification) in a closed position. For example, when the door is in a closed position and the smart door lock 100 is unlocked, the door may be opened directly (without passing a verification); when the door is in the closed position and the smart door lock 100 is locked, the door may not be opened directly. Merely by way of example, the closed position of a door may refer to a position that the door panel of the door contacts with the door frame of the door or the door panel and the door frame are in the same plane. In some embodiments, when the door is in an open position, that is, when the door panel and the door frame do not contact each other or are not in the same plane, whether the smart door lock 100 is locked does not affect the use of the door. As shown in FIG. 1, the smart door lock 100 may include an identification information verification module 110, a sensing module 120, a processing module 130, a driving module 140, a storage module 150, and a communication module 160.

The identification information verification module 110 may be configured to receive user information and determine whether the user information passes a verification. The user information may refer to information used to identify a user. In some embodiments, the identification information verification module 110 may include an identification information acquisition unit 111 and an identification information processing unit 112. The identification information acquisition unit 111 may be configured to acquire user information. The user information may include but is not limited to information related to the identity of the user such as IC card information, NFC card information (e.g., information in a tangible NFC card, information in a digital NFC card stored in a mobile device), Bluetooth key information (e.g., information in a tangible key device with a Bluetooth protocol, information in a password stored in a mobile device with a Bluetooth protocol), password information, fingerprint information, palm print information, finger vein information, voice information, face information, iris information, etc. In some embodiments, the identification information acquisition unit 111 may include a password input device, an electromagnetic induction device, an image acquisition device, a sound acquisition device, a fingerprint acquisition device, a palm print acquisition device, or the like, or any combination thereof. Specifically, the password input device may be used to obtain the password information input by the user. The electromagnetic induction device may be used to obtain the IC card information provided by the user. The image acquisition device may be used to obtain the user's face information, iris information, etc. The sound acquisition device may be used to obtain the user's voice information. The fingerprint acquisition device may be used to obtain the user's fingerprint information, finger vein information, etc. The palm print acquisition device may be used to obtain the user's palm print information. In some embodiments, the identification information acquisition unit 111 may also include a network interface to obtain user information from the user's smart device via a network. The network may be any form of a wired or wireless network. Merely by way of example, the network may include a cable network, a wired network, a fiber-optic network, a telecommunication network, an internal network, an Internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or the like, or any combination thereof. The smart device may include a smart bracelet, a smart watch, a smart mobile device, or the like.

The identification information processing unit 112 may be configured to determine whether the user information passes a verification based on the obtained user information. In some embodiments, the identification information processing unit 112 may compare the obtained user information with pre-stored user information to determine whether the obtained user information passes the verification. For example, if the obtained user information is consistent with the pre-stored user information, the identification information processing unit 112 may determine that the obtained user information passes the verification; otherwise, the identification information processing unit 112 may determine that the obtained user information does not pass the verification. As another example, if the obtained user information contains the pre-stored user information, the identification information processing unit 112 may determine that the obtained user information passes the verification; otherwise, the identification information processing unit 112 may determine that the obtained user information does not pass the verification. In some embodiments, the pre-stored user information may be information preset by a user and stored in a storage device (e.g., the storage module 150). Additionally, or alternatively, the pre-stored user information may be dynamically generated by a program/software stored in a storage device (e.g., the storage module 150) based on the user's settings. The identification information verification module 110 may transmit a verification result of the user information to the processing module 130.

The sensing module 120 may be configured to sense an action of a door. The action of a door may include but not limited to an opening action, a closing action, a holding action, an opening action followed by a closing action, or an opening action followed by a holding action, or the like, or any combination thereof. In some embodiments, the action of a door may be operated by a user or a processing device. For example, a user may operate the door from inside to perform the door opening action and/or the door closing action. As another example, the user may operate the door from outside to perform the door opening action and/or the door closing action. As another example, the processing device may drive the smart door lock to control the door to perform an automatic door opening action and/or an automatic door closing action. The door actions may be accompanied by one or more state changes.

For example, the door opening action may be accompanied by state changes including: the door panel leaving the door frame, the opening angle of the door increasing, a latch bolt and/or a dead bolt of the door retracting, a lever handle base rotating, the air pressure outside the door increasing, the air pressure inside the door decreasing, the image captured by a visual sensor of the area directly opposite to the door (e.g., the door panel on which the visual sensor is installed) changing, or the like. As another example, the door closing action may be accompanied by state changes including: the door panel approaching the door frame, the opening angle of the door decreasing, the latch bolt and/or the dead bolt of the door projecting, the lever handle base returning to its original position, the air pressure outside the door decreasing, the air pressure inside the door increasing, the image of the area directly opposite to the door changing, or the like. As another example, the door in an open position/closed position (e.g., after an opening action followed by a holding action) may be accompanied by states including: the distance between the door panel and the door frame being constant, an opening angle of the door being constant, no action of the latch bolt and/or the dead bolt, constant air pressure inside/outside the door, the image of the area directly opposite to the door not changing, or the like. In some embodiments, the sensing module 120 may sense the one or more state changes to determine the door actions. The sensing module 120 may include one or more sensing units. The one or more sensing units may include but not limited to an infrared sensing unit 121, a magnetic field sensing unit 122, a contact sensing unit 123, an orientation sensing unit 124, a visual sensing unit 125, a pressure sensing unit 126, or the like.

Merely by way of example, the infrared sensing unit 121 may include an infrared sensor, the magnetic field sensing unit 122 may include a reed sensor, the contact sensing unit 123 may include a contact sensor, the orientation sensing unit 124 may include a gyroscope sensor, an accelerometer, and a geomagnetic sensor, the visual sensing unit 125 may include a camera, and the pressure sensing unit 126 may include pressure sensor, etc. In some embodiments, the one or more sensing units may be installed on any part of the door frame, the door panel, or the smart door lock 100. For example, an infrared sensor, a contact sensor, and a pressure sensor may be placed at one or more positions near the surface or edge of the door panel, the visual sensor may be placed on the surface of the door panel, and the orientation sensor may be embedded or integrated in the smart door lock 100. The infrared sensing unit 121 and/or the magnetic field sensing unit 122 may be configured to sense a state change of the latch bolt and/or the dead bolt, a state change of the lever handle base, or a state change of the door panel and the door frame. The contact sensing unit 123 may be configured to sense a state change of the lever handle base, or a state change of the door panel and the door frame. The orientation sensing unit 124 may be configured to detect a state of the door panel, such as an absolute angle of the door panel, or an angular velocity of the door panel. The visual sensing unit 125 may be configured to obtain image or video data of the area outside the door (e.g., directly opposite to the door panel). The pressure sensing unit 126 may be configured to sense an air pressure changes on the inner surface and/or outer surface of the door panel. More descriptions regarding the one or more sensing units of the sensing module 120 may be found elsewhere in the present disclosure. See, e.g., FIGS. 6-8 and relevant descriptions thereof.

The processing module 130 may be configured to process information and/or data related to the smart door lock 100 to perform one or more functions described in the present disclosure. For example, after the identification information verification module 110 determines that the user information passes the verification, the processing module 130 may send an unlock instruction to the driving module 140. As another example, after the identification information verification module 110 determines that the user information does not pass the verification, the processing module 130 may send a notification or an alarm instruction to the communication module 160. As another example, after the sensing module 120 senses the door opening action and/or the door closing action of the door, the processing module 130 may send a lock instruction to the driving module 140. As another example, after the sensing module 120 senses the door opening action of the door but does not sense the door closing action of the door within a certain preset time (e.g., 10 seconds, 20 seconds, 30 seconds, etc.), that is, a door holding action occurs or the door is in an open state for more than a preset time, the processing module 130 may send an alarm instruction to the communication module 160. In this case, the processing module 130 may also switch at least one of the one or more sensors into a sleep mode or a low-power mode. Merely by way of example, the processing module 130 may include a central processing unit (CPU), an application specific integrated circuit (ASIC), an application specific instruction set processor (ASIP), an image processing unit (GPU), a physical operation processing unit (PPU), a digital signal processor (DSP), a field programmable gate array (FPGA), programmable logic device (PLD), a controller, a microcontroller unit (MCU), a reduced instruction set computer (RISC), a microprocessor or the like, or any combination thereof. In some embodiments, the processing module 130 may include an input/output interface (I/O interface). The processing module 130 may receive information and/or data from one or more components of the smart door lock 100 (e.g., the identification information verification module 110, the sensing module 120, and the storage module 150) via the I/O interface. The processing module 130 may also send information and/or data to one or more components of the smart door lock 100 (e.g., the identification information verification module 110, the sensing module 120, the driving module 140, and the storage module 150) via the I/O interface. In some embodiments, the I/O interface may be integrated into the communication module 160. For example, the processing module 130 may perform an information exchange and/or a data exchange with the one or more components of the smart door lock 100 (e.g., the identification information verification module 110, the sensing module 120, the driving module 140, and the storage module 150) through the communication module 160.

The driving module 140 may be configured to drive one or more components of the smart door lock 100 to implement lock/unlock operations. In some embodiments, the smart door lock 100 may be classified into different types according to its driving mechanism. Merely by way of example, the smart door lock 100 may be classified into two types: a smart door lock with a clutch device and a smart door lock without a clutch device. Merely by way of example, the clutch device may be placed between a lever handle and a dead bolt (and/or a latch bolt). When the clutch device is connected to the lever handle and the dead bolt (and/or the latch bolt), the force of lever handle may be transmitted to the dead bolt. When the clutch device is disconnected from the lever handle or the dead bolt (and/or the latch bolt), the force of lever handle may not be transmitted to the dead bolt. For a smart door lock with a clutch device, the driving module 140 may control the connecting and disconnecting of the clutch device directly or control the connecting and disconnecting of the clutch device by controlling the circuit (such as a switching circuit) or hardware related to the clutch device. When the clutch device is connected to the lever handle and the bolts (e.g., the dead bolt and/or the latch bolt), the smart door lock may be in an unlocked state. In this case, if the user presses down the handle outside the door, the bolts (e.g., the dead bolt and/or the latch bolt) may be driven to retract, and the door may be unlocked (e.g., the user can directly open the door from outside). When the clutch device is disconnected from the lever handle and/or the bolts (e.g., the dead bolt and/or the latch bolt), the smart door lock may be in a lock state. If the user presses down the handle outside the door, the dead bolt (and/or the latch bolt) may not be driven to retract and the door may be locked (e.g., the user cannot directly open the door from outside). For a smart door lock without a clutch device, the driving module 140 may drive the bolts to project and/or retract directly or drive a motor to control the projection and/or retraction of the bolts to achieve unlock/lock operation. More descriptions regarding the lock/unlock operation of the smart door lock 100 may be found elsewhere in the present disclosure. See, e.g., FIGS. 4A and 4B and relevant descriptions thereof.

The storage module 150 may be configured to store data and/or instructions. For example, the storage module 150 may store user's preset information. As another example, the storage module 150 may store data and/or instructions executed or used by the processing module 130 to implement the one or more functions of the smart door lock 100 described in the present disclosure. In some embodiments, the storage module 150 may include a large-capacity storage, a removable storage, a volatile read-write memory, a read-only memory (ROM), or the like, or any combination thereof. Exemplary mass storage may include a magnetic disk, an optical disk, a solid-state drive, etc. Exemplary removable memories may include flash drives, floppy disks, optical disks, memory cards, compact disks, magnetic tapes, or the like. An exemplary volatile read-write memory may include a random access memory (RAM). Exemplary random access memory may include a dynamic random access memory (DRAM), a double-rate synchronous dynamic random access memory (DDRSDRAM), a static random access memory (SRAM), a thyristor random access memory (T-RAM), a zero-capacity random access memory (Z-RAM), or the like. Exemplary read-only memories may include a photomask-type read-only memory (MROM), a programmable read-only memory (PROM), an erasable programmable read only memory (EPROM), an electronically erasable programmable read only memory (EEPROM), a compact disk read-only memory (CD-ROM), a digital general-purpose disk read-only memory, or the like. In some embodiments, the storage module 150 may be implemented on a cloud platform. Merely by way of example, the cloud platform may include a private cloud, a public cloud, hybrid cloud, a community cloud, a distributed cloud, an interconnected cloud, a multi-cloud, or the like, or any combination thereof.

The communication module 160 may be used to facilitate information and/or data exchange. In some embodiments, one or more components of the smart door lock 100 (e.g., the identification information verification module 110, the sensing module 120, the processing module 130, the driving module 140, and the storage module 150) may send information and/or data to other components in the smart door lock 100 through the communication module 160. For example, the identification information verification module 110 may send a determination result of whether the user information passes the verification to the processing module 130 through the communication module 160. As another example, the processing module 130 may send an unlock instruction or a lock instruction to the driving module 140 through the communication module 160. The communication module 160 may also be used to facilitate information exchange between the user and the smart door lock 100. The information exchange between the user and the smart door lock 100 may include but is not limited to text notification, voice notification, sound alarms, light alarms, or the like. For example, when the user information input by the user does not pass the verification, the communication module 160 may remind the user to re-enter the user information (e.g., by a voice notification). As another example, when the door is detected to be in an open position for a long time, the communication module 160 may generate an audible alarm to remind the user to close the door.

It should be noted that the smart door lock 100 and relevant modules may be implemented in various ways. For example, the smart door lock 100 and relevant modules may be implemented through hardware, software, or a combination of software and hardware. Wherein, the hardware component may be implemented by a dedicated logic, and the software component may be stored in the storage which may be executed by a suitable instruction execution system, for example, a microprocessor or a dedicated design hardware. It will be appreciated by those skilled in the art that the above methods and systems may be implemented by computer-executable instructions and/or embedding in control codes of a processor. For example, the control codes may be provided by a medium such as a disk, a CD or a DVD-ROM, a programmable memory device such as read-only memory (e.g., firmware), or a data carrier such as an optical or electric signal carrier. The smart door lock 100 and relevant modules of the present disclosure may be implemented by hardware circuits, e.g., very large scale integrated circuits or gate arrays, semiconductors such as logic chips or transistors, programmable hardware devices such as field-programmable gate arrays or programmable logic devices, etc. The smart door lock 100 and relevant modules may be implemented by software executed by various processors. The smart door lock 100 and relevant modules may also be implemented by a combination (e.g., firmware) of the hardware circuits and the software.

It should be noted that the above description of the smart door lock 100 and relevant modules is for convenience of description only, and cannot limit the present disclosure to be within the scope of the illustrated embodiment. For persons having ordinary skills in the art, modules may be combined in various ways or connected with other modules as sub-systems, and various modifications and transformations in form and detail may be conducted under the teaching of the present disclosure. For example, the identification information acquisition unit 111 may be combined with the sensing module 120 as one module. Such modification is within the protection scope of the present disclosure.

Figure 2:
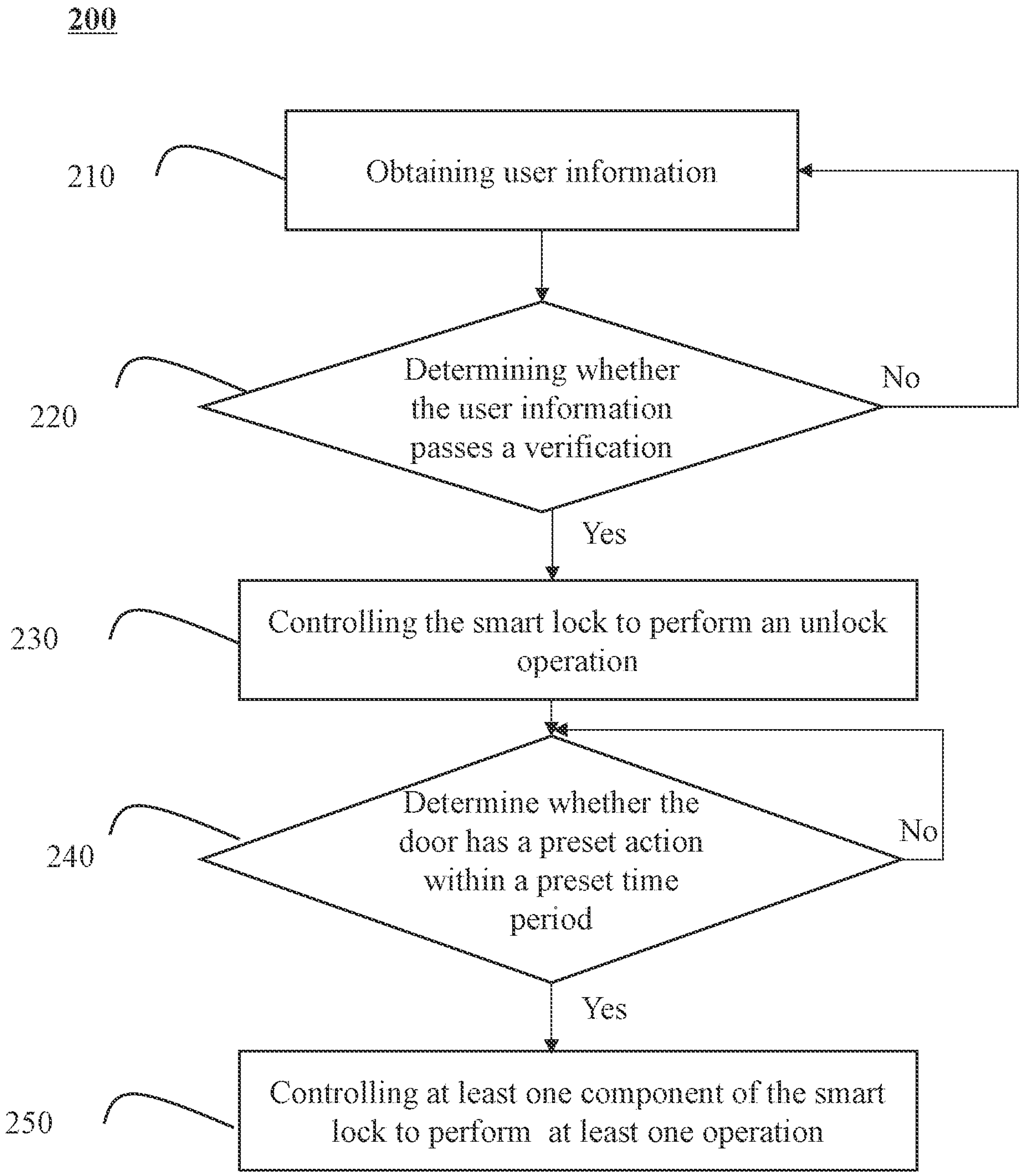
FIG. 2 is a flowchart illustrating a method for automatically unlocking or locking a smart door lock according to some embodiments of the present disclosure.

FIG. 2 is a flowchart illustrating a method for automatically unlocking or locking a smart door lock according to some embodiments of the present disclosure. In some embodiments, the process 200 may be implemented by the modules shown in FIG. 1. For example, the process 200 may be stored in the storage module 150 in the form of programs or instructions, and when the programs or instructions are executed, e.g., by the processing module 130, the process 200 may be implemented.

In 210, the identification information verification module 110 (for example, the identification information acquisition unit 111 and the identification information processing unit 112) may obtain user information. Specifically, the identification information acquisition unit 111 may collect user identification features, and the identification information processing unit 112 may process the user identification features to generate the user information. Alternatively, the identification information acquisition unit 111 may collect user information directly. In some embodiments, user identification features may include but not limited to identification items, identification keys, biological features, or the like. The identification items may include but not limited to keys, IC (Integrated Circuit) cards, access cards, or the like. Identification keys may include: commands, passwords, etc. Biological features may include but not limited to fingerprints, palm prints, finger veins, voices, human faces, irises, or the like. User information generated by processing the user identification features may include but not limited to IC card information, access card information, password information, fingerprint information, palm print information, finger vein information, voice information, facial information, iris information, or the like.

In some embodiments, identification information acquisition unit 111 may acquire user information in a contact manner or in a contactless manner. Specifically, the acquisition of user information in the contact manner may include a user inputting the user information manually through, for example, a password panel, a user holding a card (for example, an IC card, an access control card), or the like. The acquisition of user information in the contactless manner may include voice input, face recognition, iris recognition, or the like. In some embodiments, the acquisition of user information in the contactless manner may also include acquiring user information through a smart device of the user. For example, the identification information acquisition unit 111 may acquire user information from bracelets worn by users, mobile smart devices held by users, applications (APP) installed in the mobile smart devices, etc., via a network technology such as NFC (Near Field Communication), Bluetooth™, WIFI, LAN (local area network), etc.

In some embodiments, the user information generated by the identification information processing unit 112 may be stored in the smart door lock 100 (e.g., in the storage module 150). Alternatively, the user information may be stored in an external database (such as a cloud disk).

It should be noted that the above description regarding the process 200 is merely provided for the purposes of illustration and description, and not intended to limit the scope of application of this specification. For those skilled in the art, various variations and modifications may be made to the process 200 under the teachings of this specification. However, these variations and modifications do not depart from the scope of the present specification. The specific embodiments of the present specification have been described above. Other embodiments do not depart from the scope of the following claims. In some cases, the actions or steps recited in the claims may be performed in a different order than in the embodiments and may still achieve the desired result. In addition, the processes depicted in the figures do not necessarily require the particular order shown or sequential order to achieve the desired results.

In 220, the identification information verification module 110 (for example, the identification information processing unit 112) may determine whether the user information passes the verification. In some embodiments, the user information may be directly acquired by identification information unit 111 generated by the identification information processing unit 112 based on user identification features.

In some embodiments, the smart door lock 100 may store identification information of a user in advance. Users with pre-stored user information may have the right to enter the house. In some embodiments, the identification information processing unit 112 may compare the user information to be verified with a pre-stored user information to determine whether the user information passes the verification. In some embodiments, the identification information processing unit 112 may also determine whether the user information passes verification based on whether at least part of the user information to be verified includes pre-stored user information.

In some embodiments, the smart door lock may store at least one type of user information for at least one user. For example, the smart door lock may store fingerprint information of a plurality of family members. As another example, the smart door lock may store fingerprint information, face information, and sound information of an individual user.

Taking a password as an example, the identification information processing unit 112 may acquire password information input by the user at the password identification device 550 and compare it with a pre-stored password in the smart door lock. The identification information processing unit 112 may determine that the user information is correct and the user passes the verification based on a comparison result that the password information input by the user matches with the pre-stored password; the identification information processing unit 112 may determine that the user information is incorrect based on a comparison result that the password information input by the user does not match with the pre-stored password information, and return to operation 210 to acquire the user password again. In some embodiments, the identification information processing unit 112 may determine whether the password information input by the user includes the password pre-stored in the smart door lock. The identification information processing unit 112 may determine that the user information is correct and the user passes the verification based on a result that the password input by the user contains the pre-stored password; the identification information processing unit 112 may determine that the user information is incorrect based on a result that the password information input by the user does not contain a pre-stored password, and return to operation 210 to acquire the user password again. Merely by way of example, when identification information processing unit 112 allows the user to input the password, the user may input arbitrary characters before or after the correct password, thereby reducing the possibility of the password being leaked or peeped. For example, the pre-stored password in identification information processing unit 112 or storage module 150 may be 20170817. The user may input password 7180710220170817. Since the password 7180710220170817 input by the user contains the correct password 20170817, the smart door lock may determine that the information input by the user is correct and the user passes the verification.

Taking fingerprint information as an example, the identification information acquisition unit 111 may acquire fingerprint information input by the user at the fingerprint identification device 540, and the identification information processing unit 112 may compare the fingerprint information with a pre-stored fingerprint. The identification information processing unit 112 may determine that the user information is correct and pass the verification based on a comparison result that the fingerprint information input by the user matches with the pre-stored fingerprint; the identification information processing unit 112 may determine that the user information is incorrect based on a comparison result that the fingerprint information input by the user does not match with the pre-stored fingerprint, and return to operation 210 to acquire the user fingerprint again.

Taking an access control card as an example, the smart door lock 100 may use RFID (Radio Frequency Identification) technology to determine whether the user information contained in the access control card passes the verification. Specifically, when a user holds an access control card close to a card reader region of a smart door lock, the identification information processing unit 112 may read the information stored in the access control card as the user information, and determine whether the read information is consistent with the information pre-stored in the smart door lock. The identification information unit 112 may determine that the user information is correct, and the user information passes the verification based on a comparison result that the user information matches with the pre-stored information. The identification information unit 112 may determine that the user information is incorrect based on a comparison result that the user information does not match with the pre-stored information, and return to operation 210 to acquire the user information in the access control card again.

Similarly, the identification information processing unit 112 may acquire face information, and determine whether the user information associated with the face information passes the verification. Alternatively, the identification information processing unit 112 may also verify other types of user information (such as voice information, iris information, finger veins, etc.) to determine whether the user information passes the verification.

In some embodiments, the identification information acquisition unit 111 may acquire an input time when the user entered the user information (e.g., a password). In some embodiments, the aforementioned user information (e.g., a password) and the input time when the user entered the user information may be collectively referred to as user information. The identification information processing unit 112 may determine whether the user information passes the verification based on the input time and the user information. For example, the identification information processing unit 112 may first compare the user information to be verified with pre-stored user information. In response to a determination that the input user information is the same as the pre-stored user information, the identification information processing unit 112 may compare the input time and a preset time of use of the user information. The identification information processing unit 112 may determine that the user information passes the verification only when both the input information and the input time pass the verification. More descriptions regarding the verification of the user information may be found elsewhere in the disclosure. See, e.g., FIGS. 9-13 and relevant descriptions thereof.

In some embodiments, the pre-stored user information may be stored inside the smart door lock 100 (such as the storage module 150), or in an external storage device (such as an external database, a cloud disk). In some embodiments, the user information and the pre-stored information may be sent to the processing module 130 of the smart door lock 100 through the communication module 160 and compared by the processing module 130. In some embodiments, a user (or the processing module 130) may add or delete one or more pre-stored user information according to his/her requirements.

In some embodiments, incomplete user information input, unrecognizable user information, incorrect user information, may cause the identification information acquisition unit 111 to fail to acquire the user information. At this time, the identification information processing unit 112 may determine that the user information does not pass the verification and return to operation 210 to acquire the user information again. In some embodiments, when the user information failed the verification more than a certain number of times (for example, three times, five times, etc.), the processing module 130 may generate a notification or an alarm instruction.

In 230, the processing module 130 and the driving module 140 may control the smart door lock to perform an unlock operation. In some embodiments, the processing module 130 may control the smart door lock to be unlocked based on the result that the user information passes the verification. Specifically, the processing module 130 may send an unlock instruction to the driving module 140, and the driving module 140 may drive the mechanical components (such as a motor, a clutch device, etc.) of the smart door lock 100 to perform an unlock operation according to the unlock instruction.

In some embodiments, the smart door lock 100 may automatically control the lock/unlock operation of its related components. For example, the smart door lock 100 may be classified into two types: a smart door lock with a clutch device and a smart door lock without a clutch device. In some embodiments, the clutch device may connect or disconnect two rotating shafts (for example, a lever handle and bolts, including a dead bolt and/or a latch bolt). When the clutch device is connected to the lever handle as well as the bolts, the force of lever handle may be transmitted to the bolts. When the clutch device is disconnected from the lever handle as well as the bolts, the force of lever handle may not be transmitted to the bolts. Taking the smart door lock with a clutch device as an example, the processing module 130 may connect the clutch device to the lever handle and the bolts to control the smart door lock to be in an unlocked state. The user may cause a lever handle base to rotate by pressing down the door handle. The rotation of the lever handle base may further drive the square steel to rotate, and dead bolt and latch bolt to retract. The user may open the door when the dead bolt and the latch bolt are retracted. Taking a smart door lock without a clutch device as an example, the driving module 140 may drive the dead bolt to retract by controlling the forward rotation of the motor, so that the smart door lock may be in an unlocked state, and the user may open the door to enter the home. More descriptions regarding the smart door locks with or without the clutch device may be found elsewhere in the disclosure. See, e.g., FIG. 4 and relevant descriptions thereof.

In 240, the sensing module 120 and the processing module 130 may determine whether the door has a preset action. In present disclosure, after the smart door lock performs an unlock operation, the state of the door on which the smart door lock is installed may be detected. The state of the door may include but is not limited to opening, closing, opened, closed, or other states. In some embodiments, the processing module 130 may perform lock operations based on one or more actions of the door. In some embodiments, the processing module 130 may perform operations such as generating a notification or an alarm instruction based on one or more actions of the door.

In some embodiments, the preset actions that occurs on the door may include but not limited to a door opening action, a door closing action, a door holding action, a door opening action followed by a door closing action, a door opening action followed by a door holding action, or any other combination of the door opening action and the door closing action. For example, the processing module 130 may control smart door lock to perform a lock operation based on a door opening action. As another example, the processing module 130 may control smart door lock to perform a lock operation based on a door closing action. As another example, the processing module 130 may control smart door lock to perform a lock operation based on a combination of the door opening action and the door closing action. As another example, the processing module 130 may also perform an alarm generating operations based on a situation that the door is not closed within a certain period of time after the door is opened.

In some embodiments, the preset action of the door may be operated by a user or a processing device. For example, a user may operate the door from inside to perform the door opening action and/or the door closing action. As another example, the user may operate the door from outside to perform the door opening action and/or the door closing action. As another example, the processing device may drive the smart door lock to control the door to perform an automatic door opening action and/or an automatic door closing action.

For example, the door opening action may be accompanied by state changes including: the door panel leaving the door frame, the opening angle of the door increasing, a latch bolt and/or a dead bolt of the door retracting, a lever handle base rotating, the air pressure outside the door increasing, the air pressure inside the door decreasing, the image of the area directly opposite to the door changing, or the like. As another example, the door closing action may be accompanied by state changes including: the door panel approaching the door frame, the opening angle of the door decreasing, the latch bolt and/or the dead bolt of the door projecting, the lever handle base returning to its original position, the air pressure outside the door decreasing, the air pressure inside the door increasing, the image of the area directly opposite to the door changing, or the like. As another example, the door in an open position/closed position (e.g., after an opening action followed by a holding action) may be accompanied by states including: the distance between the door panel and the door frame being constant, an opening angle of the door being constant, no action of the latch bolt and/or the dead bolt, constant air pressure inside/outside the door, the image of the area directly opposite to the door not changing, or the like.

In some embodiments, the sensing module 120 may sense the one or more state changes to determine the door actions. The sensing module 120 may include one or more sensing units. The one or more sensing units may include but not limited to the infrared sensing unit 121, the magnetic field sensing unit 122, the contact sensing unit 123, the orientation sensing unit 124, the visual sensing unit 125, the pressure sensing unit 126, or the like.

Merely by way of example, the infrared sensing unit 121 may include an infrared sensor, the magnetic field sensing unit 122 may include a reed sensor, the contact sensing unit 123 may include a contact sensor, the orientation sensing unit 124 may include a gyroscope sensor, an accelerometer, and a geomagnetic sensor, the visual sensing unit 125 may include a camera, and the pressure sensing unit 126 may include pressure sensor. In some embodiments, the one or more sensing units may be installed on any part of the door frame, the door panel, or the smart door lock 100. For example, an infrared sensor, a contact sensor, and a pressure sensor may be placed at one or more positions near the surface or edge of the door panel, the visual sensor may be placed on the surface of the door panel, and the orientation sensor may be embedded or integrated in the smart door lock 100. The infrared sensing unit 121 and/or the magnetic field sensing unit 122 may be configured to sense a state change of the latch bolt and/or the dead bolt, a state change of the lever handle base, or a state change of the door panel and the door frame. The contact sensing unit 123 may be configured to sense a state change of the lever handle base, or a state change of the door panel and the door frame. The orientation sensing unit 124 may be configured to detect a state of the door panel, such as an absolute angle of the door panel, or an angular velocity of the door panel. The visual sensing unit 125 may be configured to obtain image or video data of the area outside the door (e.g., directly opposite to the door panel). The pressure sensing unit 126 may be configured to sense an air pressure changes on the inner surface and/or outer surface of the door panel.

In some embodiments, the magnetic field sensing unit 122 may be used to determine whether the door has a preset action. The magnetic field sensing unit 122 may include but be not limited to a geomagnetic sensor, a Hall sensor, or the like. In some embodiments, the geomagnetic sensor may acquire the absolute angle of the door panel with respect to the earth by detecting the direction of the geomagnetic field, and determine the action of the door according to the change of the absolute angle. In some embodiments, whether the door has a preset action may be determined by the cooperation of the magnetic field sensing unit 122 and a magnet. For example, the magnetic field sensing unit 122 (e.g., the geomagnetic sensor or the Hall sensor) may be installed on the door panel, and the magnet may be installed on any part of the door frame. The magnet may affect the detection result of the magnetic field sensing unit 122 (e.g., the magnetic field strength and/or the magnetic field direction detected by the magnetic field sensing unit 122). Thus, different distances between the magnetic field sensing unit 122 and the magnet may correspond to different magnetic fields and/or different magnetic field directions detected by the magnetic field sensing unit 122. Therefore, the action of the door can be determined according to the changing trend of the magnetic field and/or the magnetic field direction detected by the magnetic field sensing unit 122 according to the distance.

In some embodiments, the contact sensing unit 123 may be used to determine whether the door has a preset action. The contact sensing unit 123 may include a contact sensor (e.g., a button, a switch, etc.). The contact sensor may determine that the door has a door closing action when the sensor is pressed by the door frame, and determine that the door has a door opening action when the sensor is released by the door frame.

In some embodiments, the orientation sensing unit 124 may be used to determine whether the door has a preset action. The orientation sensing unit 124 may include but not limited to a gyroscope sensor, a geomagnetic sensor, or the like. The gyroscope sensor may be built into the smart door lock, and determine whether the door has a preset action by detecting the angular velocity (or an angle after processing the angular velocity) of the door. For example, the processing module 130 may determine that the door is in a closed state when the gyroscope detects that the angle of the door lies between-2 degrees and 2 degrees. As another example, the processing module 130 may determine that the door is in an open state when the gyroscope detects that the angle of the door is greater than 2.35 degrees. As another example, the processing module 130 may determine that the door has an opening action when the angle of the door changes from a first angle between-2 degrees and 2 degrees to a second angle greater than 2.35 degrees. As another example, the processing module 130 may determine that the door has a closing action when the angle of the door changes from a second angle greater than 2.35 degrees to a first angle between-2 degrees and 2 degrees. In some embodiments, the processing module 130 may determine whether the door has a preset action based on an angular velocity (or an angle after processing the angular velocity) of the door detected by the gyroscope sensor and acceleration information detected by the accelerometer. For example, when the gyroscope sensor detects that the angle of the door lies between-2 degrees and 2 degrees (or less than 2 degrees), and the accelerometer detects that the acceleration of the door exceeds a threshold, the processing module 130 may determine that the door had a closing action and is eventually closed. It should be noted that the angles used herein are provided as examples and shall not be limiting. Those skilled in the art may change the angles or angle threshold under the teaching of the present disclosure. Such change or variation lies in the protection scope of the present disclosure.

In some embodiments, the visual sensing unit 125 may determine whether the door has a preset action. The visual sensing unit 125 may include a camera or a device with visual capturing ability, such as a color camera, a digital camera, a camcorder, a PC camera, a network camera, a closed circuit television (CCTV), a PTZ camera, a video sensing device, or the like, or any combination thereof. The visual sensing unit 125 may be installed on the surface of the door panel. In some embodiments, the visual sensing unit 125 may be used to monitor the environment around the door (for example, the region directly outside the door, the corridor area outside the door, stair area or elevator area outside the door, etc.). The visual sensing unit 125 may acquire the environmental information such as flat image information, stereo image information, video information, sound information, etc. For example, if an image of the area directly opposite to the door obtained by a camera installed on the outer surface of the door panel changes from an image of a wall opposite to the door to an image of a corridor on the side of the door, it may be determined that the door has an opening action. As another example, when the image of the area directly opposite to the door obtained by the camera changes from an image of a corridor on the side of the door to an image of the wall directly opposite to the door, it may be determined that the door has a closing action. As another example, when the image of the area directly opposite to the door acquired by the camera remains as an image of a corridor for a certain period of time, it may be determined that the door is opened and held (has an opening action followed by a holding action). In some embodiments, whether the door has a preset action may also be determined by other sensors. For example, a voice sensor may determine whether someone is walking passing the door. In some embodiments, the visual sensing unit 125 may also be used in combination with the identification information acquisition unit 111. For example, the identification information acquisition unit 111 may acquire visual identification information (such as face information, pupil information, iris information, etc.) while the visual sensing unit 125 monitors the surroundings of the door. When the visual sensing unit 125 is used in combination with the identification information acquisition unit 111, they may be combined as a single sensor.

In some embodiments, the pressure sensing unit 126 may determine whether the door has a preset action. The pressure sensing unit 126 may include but not limited to a pressure sensor, an air pressure sensor, or the like. In some embodiments, the pressure sensor may be used to determine whether the door has a door opening action based on whether the door panel changes from a state of pressing the door frame (e.g., high pressure) to a state of releasing the door frame (e.g., low pressure). Specifically, it may be determined that the door has an opening action when the door panel is sensed to change from a state of pressing the door frame to a state of leaving the door frame; and it may be determined that the door has a closing action when the door panel is sensed to change from a state of leaving the door frame to a state of pressing the door frame. In some embodiments, at the moment the door opens and/or closes, the air pressure inside and/or outside the door may change. The air pressure sensor may determine whether the door has a door opening action and/or a door closing action based on changes in air pressure inside and outside the door.

In 250, the driving module 140 and the processing module 130 may control the smart door lock to execute a lock operation based on the determination result of the preset action of the door. In some embodiments, the lock operation may refer to an operation of making the latch bolt and/or the dead bolt of the smart door lock in a projection state. Additionally, or alternatively, the lock operation may refer to an operation of making the clutch device disconnected from the latch bolt and/or the dead bolt so that the user cannot control the state of the latch bolt and the dead bolt by pressing down or lifting up the door handle.

In some embodiments, the processing module 130 may control the smart door lock to perform a lock operation based on the preset action of the door determined in operation 240. For example, the processing module 130 may control the smart door lock to perform related operations based on a door opening action, a door closing action, a door opening action followed by a door closing action, and a door opening action followed by a holding action, etc.

In some embodiments, the processing module 130 may control the smart door lock to perform a lock operation based on the door opening action. For example, when the processing module 130 determines that the door has a door opening action, the clutch device of the smart door lock with a clutch device may be controlled to change from a connected state to a disconnected state. When the clutch device is in a disconnected state, the power generated when pressing down handle may not be transmitted to the bolts, so when the user attempts to open the door by pressing down the handle, the bolt can no longer be controlled.

In some embodiments, the processing module 130 may control the smart door lock to perform a lock operation based on the door closing action. For example, when the processing module 130 determines that the door has a door closing action, the processing module 130 may control the motor of a smart door lock (if the smart door lock does not have a clutch device) to drive the dead bolt and latch bolt to project, thereby realizing a secure lock of the smart door lock. As another example, when the processing module 130 determines that the door has a door closing action, the processing module 130 may control the smart door lock (if the smart door lock has a clutch device) to drive the clutch device to cause the dead bolt to project, thereby realizing a secure lock of the smart door lock.

It should be noted that the above description of the smart door lock automatic lock process 200 is merely provided for the purposes of illustration, and not intended to limit the scope of application of the present disclosure. For those skilled in the art, under the teachings of the present disclosure, various variations and modifications may be made to the smart door lock automatic lock process 200. However, those variations and modifications do not depart from the scope of the present disclosure. For example, smart door locks are not limited to smart door locks with and without a clutch device. As another example, there are more other types of preset actions that may occur on the door, and corresponding operations may be performed.

Figure 3:
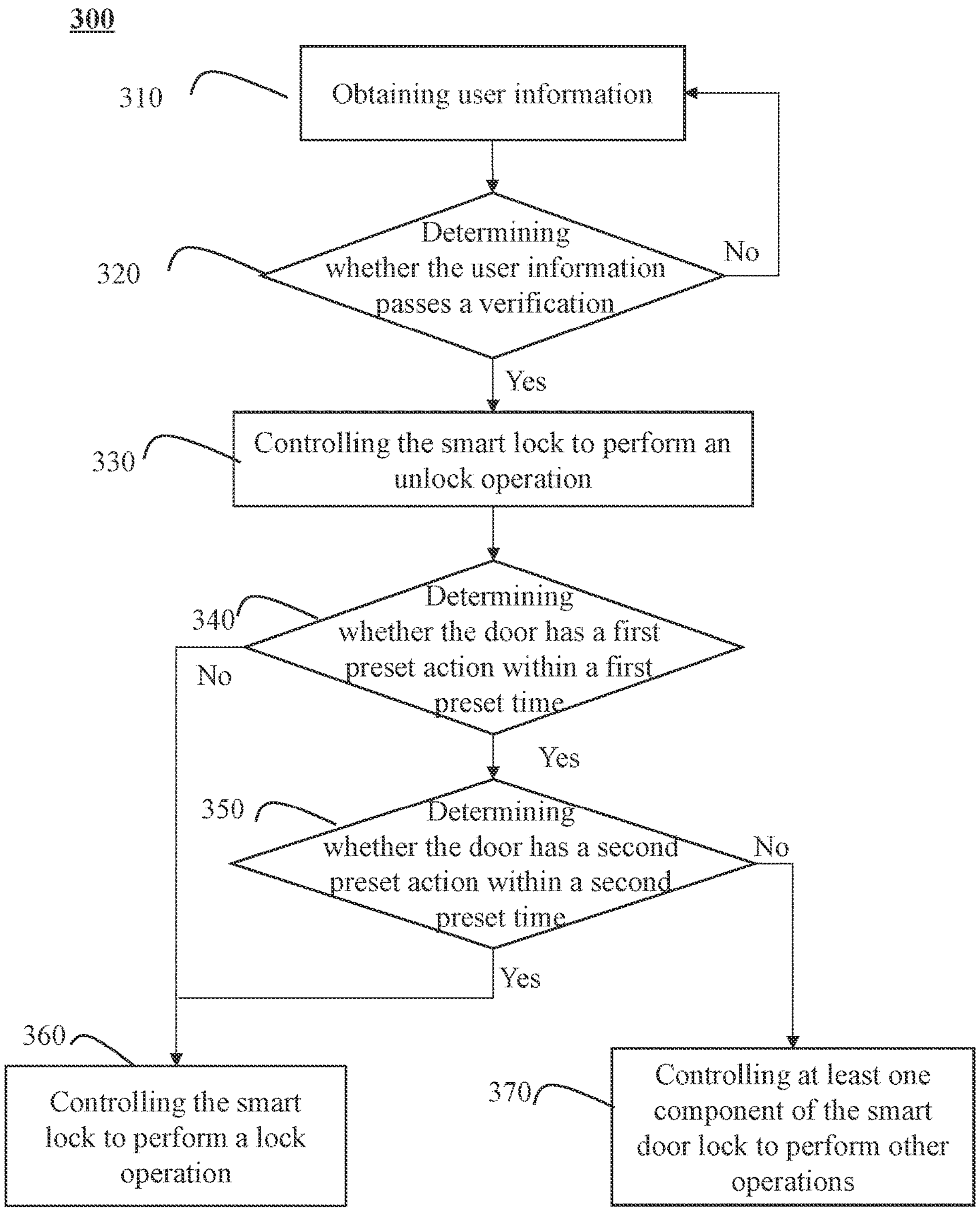
FIG. 3 is flowchart illustrating another method for automatically unlocking or locking a smart door lock according to some embodiments of the present disclosure.

FIG. 3 is a flowchart illustrating another method for automatically unlocking or locking a smart door lock according to some embodiments of the present disclosure.

In 310, the identification information verification module 110 (for example, the identification information acquisition unit 111 and the identification information processing unit 112) may acquire the user information. More descriptions regarding the operation 310 may be found elsewhere in the disclosure. See operation 210 in process 200 and relevant descriptions thereof.

In 320, the identification information verification module 110 (for example, the identification information processing unit 112) may determine whether the user information passes the verification. More descriptions regarding the operation 320 may be found elsewhere in the disclosure. See operation 220 in process 200 and relevant descriptions thereof.

In 330, processing module 130 and driving module 140 may control the smart door lock to perform the unlock operation. More descriptions regarding the operation 330 may be found elsewhere in the disclosure. See operation 230 in process 200 and relevant descriptions thereof.

In 340, the sensing module 120 and the processing module 130 may determine whether the door has a first preset action within a first preset time. In present disclosure, after the smart door lock performs an unlock operation, the door may be in an accessible state at any time. When the user fails to close the door or the smart door lock is not locked within a certain period of time, there may be a hidden safety hazard for undesired people to enter the room. Therefore, the processing module 130 may control the door to automatic lock or perform other corresponding operations based on the actions of the door that occurs within a preset time.

In some embodiments, the first preset action of the door may be a door opening action. As described in operation 240, the door having a preset door opening action may be sensed and determined by the sensing module 120. More descriptions regarding the sensor determining whether the door has a door opening action may be found elsewhere in the present disclosure. See operation 240 in process 200 and relevant descriptions thereof.

In some embodiments, the geomagnetic sensor may determine that the door has a door opening action based on the result that the absolute angle of the detected door with respect to the earth increases. As another example, the contact sensor may determine that the door has a door opening action based on the sensing signal that the contact sensor is retracted by the door frame. As another example, the infrared sensor may determine that the door has a door opening action based on the sensing signals on both sides of the latch bolt and the dead bolt. As another example, the orientation sensor may determine that the door has a door opening action based on the angular velocity detected by the gyroscope or the angle processed according to the angular velocity. The air pressure sensor may determine whether the door has a door opening action based on the air pressure change inside or outside the door. The visual sensor may determine that the door has a door opening action based on the acquired image information of the area directly opposite to the door changing from an image of a wall opposite to the door to an image of a corridor image on the side of the door. In some embodiments, one or more sensors of the sensing module 120 may be used alone or in combination with other sensors.

The first preset time may be a time threshold or a maximum time limit for the smart door lock from performing the unlock operation to the first preset action. The first preset time may be, for example, 5 seconds, 10 seconds, 20 seconds, 30 seconds, 1 minute, or the like. Alternatively, the first preset time may also be a certain time range, for example, 10 seconds to 20 seconds, 30 seconds to 40 seconds, etc. If the processing module 130 determines that the door has a first preset action (e.g., a door opening action) within the first preset time from the unlock operation, the process 300 may proceed to 350; otherwise, the process 300 may proceed to operation 360. For example, if the door does not have an opening action within 30 seconds after the smart door lock is unlocked, the process 300 may proceed to operation 360 to lock the door as the smart door lock may determine that the user may temporarily decide not to enter the room anymore.

In some embodiments, the first preset time may be set in advance by the processing module 130 in the smart door lock system, or set by the user according to actual requirements. It should be noted that the first preset time is not limiting but may be changed.

In 350, the processing module 130 may determine whether the door has a second preset action within the second preset time. In some embodiments, the second preset action of the door may be a door closing action. More descriptions regarding the sensor determining whether the door has a door closing action may be found elsewhere in the present disclosure. See operation 240 in process 200 and relevant descriptions thereof. In some embodiments, the preset action of the door may be operated by a user or a processing device. For example, a user may operate the door from inside to perform the door opening action and/or the door closing action. As another example, the user may operate the door from outside to perform the door opening action and/or the door closing action. As another example, the processing device may drive the smart door lock to control the door to perform an automatic door opening action and/or an automatic door closing action.

In some embodiments, the geomagnetic sensor may determine that the door has a closing action based on the result that the absolute angle of the detected door with respect to the earth gradually decreases. As another example, the contact sensor may determine that the door has a door closing action based on the sensing signal that the sensor is pressed by the door frame. As another example, the infrared sensor may determine that the door has a closing action based on the sensing signals on both sides of the latch bolt and the dead bolt. As another example, the orientation sensor may determine that the door has a door closing action based on the angular velocity detected by the gyroscope or the angle processed according to the angular velocity. The air pressure sensor may be used to determine whether the door has a door closing action based on the air pressure change inside and outside the door when the door is closed. The visual sensor may be used to determine that the door has a door closing action based on the acquired image information of the area facing the door changes from an image of a corridor on the side of the door to an image of a wall image facing the door. In some embodiments, one or more sensors in the sensing module 120 may be used alone or in combination with other sensors.

The second preset time may be a time threshold or a maximum time limit between the first preset action of the door and the second preset action. The second preset time may be 5 seconds, 10 seconds, 20 seconds, 30 seconds, 1 minute, or the like. Alternatively, the second preset time may be a certain time range, for example, 10 seconds to 20 seconds, 30 seconds to 40 seconds, etc. If the processing module 130 determines that the door has a second preset action (e.g., the door is closed within a second preset time), the process 300 may proceed to the operation 360; otherwise, if the processing module 130 determines that no second preset action occurs within the second preset time, the process 300 may proceed to the operation 370. This situation may happen when the user forgets to close the door or intends to hold the door.

In some embodiments, at least one of the operations 340 and 350 may be omitted arbitrarily. For example, if operation 340 is omitted, operation 350 may be directly performed to determine whether the door has a second preset action within a preset time after the smart door lock is unlocked. As another example, if operation 350 may be omitted, operation 340 may be directly performed to determine whether the door has a first preset action within a preset time after the smart door lock is unlocked. The order of the operations 340 and 350 may also be swapped.

In 360, the sensing module 120 and the processing module 130 may control the smart door lock to perform the lock operation based on the result that the door has not the first preset action within the first preset time (e.g., user temporarily decides not to enter the room), or the result that the door has the first preset action followed by a second preset action within the second preset time (e.g., user opens the door and then closes it).

In 370, the sensing module 120 may control the related components to perform other operations based on the result that the door has the first preset action followed by a holding action (e.g., not followed by the second preset action within the second preset time). In some embodiments, the holding action may be operated by the door, other components of the door, the user, an object placed by the user, or simply because of the lack of spring or similar mechanism to pull the door back when opened. In some embodiments, the sensing module 120 may determine that the door has the first preset action followed by a holding action and further determine that the door may still be in an open state which contains a hidden danger. In some embodiments, the processing module 130 may control related components to perform other operations. Relevant components may include but not limited to sensing modules 120 (for example, gyroscope, accelerometer, etc.), communication modules 160 (for example, processing equipment, server, etc.), alarm devices (such as buzzer alarm, voice alarm), etc.

In some embodiments, the processing module 130 may control a sensing module 120 (such as a gyroscope) to enter a sleep mode or a low-power mode to save power. Some of the sensing units of the sensing module 120 (e.g., an accelerometer) may continuously work to sense the movement of the door such that when they sense the movement of the door, they may cause the processing module 130 to control the slept sensors back to a work mode or a high-power mode. For example, the sensing module 120 may include a gyroscope and an accelerometer. In order to save power, the processing module 130 may control the gyroscope to enter the sleep mode in response to determining that the door performs the holding action. Further, the processing module 130 may also control the accelerometer to enter the low-power mode. When the door (or door panel) moves again, the accelerometer may immediately detect acceleration information of the door. The processing module 130 may generate a wake signal based on the acceleration information detected by the accelerometer and control the gyroscope to enter the high-power mode (or the work mode) based on the wake signal. Therefore, the processing module 130 can determine whether the door has a preset action by detecting the angular velocity (or an angle after processing the angular velocity) of the door using the gyroscope.

It should be noted that when the gyroscope is in the sleep mode, elements for angular velocity detection of the gyroscope may be in a non-working state, while wake-up related elements or interfaces and power supply related elements or interfaces that are still in a working state. When the gyroscope is in the high-power mode (or the work mode), all elements (including the elements for angular velocity detection, the wake-up related elements or interfaces, and power supply related elements or interfaces) are in the working state. When the accelerometer is in the low-power mode, the accelerometer cannot accurately detect the acceleration information (e.g., an acceleration value) of the door, but can roughly determine the changing trend of acceleration (e.g., whether the acceleration value is 0 or greater than a certain threshold). It should be noted that in the present disclosure unless otherwise specified or otherwise defined, the term "work mode" refers to a normal working state, that is, the high-power mode.

In some embodiments, in order to improve the accuracy of the angle detected by the gyroscope during the process of switching the gyroscope from the sleep mode to the high-power mode, the angle acquired by the gyroscope may be corrected based on an angle acquired by a geomagnetic sensor. Specifically, the geomagnetic sensor may acquire the absolute angle of the door panel with respect to the earth by detecting the direction of the geomagnetic field. Each angle of the door panel acquired by the geomagnetic sensor may correspond to a door opening angle of the door panel. After the door panel performs the first preset action, the door panel may remain stationary, that is, the door panel may perform the holding action. At this time (e.g., a first time point), the processing module 130 may obtain and store a first angle acquired by the geomagnetic sensor and a second angle acquired by the gyroscope when the door panel is at the current position corresponding to the first time point. The processing module 130 may further determine a corresponding relationship between the first angle acquired by the geomagnetic sensor and the second angle acquired by the gyroscope. In order to save power, the processing module 130 may control the gyroscope to enter the sleep mode in response to determining that the door performs the holding action. At the same time, the processing module 130 may also control the geomagnetic sensor to enter the sleep mode (or the low-power mode) and control the accelerometer to enter the low-power mode.

After the door performs the holding action for a period of time (e.g., 10 minutes, 30 minutes, 1 hour, etc.), and when the door moves again, the processing module 130 may generate a wake signal based on the acceleration information acquired by the accelerometer and control the gyroscope and the geomagnetic sensor to enter the high-power mode based on the wake signal. At this time (e.g., a second time point), since an accumulated error of the gyroscope, an angle acquired by the gyroscope at the second time point may be different from the first angel acquired by the gyroscope at the first time point, while an angle acquired by the geomagnetic sensor at the second time point may the same as the second angle acquired by the gyroscope at the first time point. The processing module 130 may correct the angle detected by the gyroscope at the second time point based on the angle acquired by the geomagnetic sensor at the second time point and the corresponding relationship between the first angle and the second angle. For example, the processing module 130 may determine the angle detected by the gyroscope at the second time point as the first angle. Therefore, the processing module 130 can determine whether the door has a preset action by detecting the angular velocity (or an angle after processing the angular velocity) of the door using the gyroscope.

In some embodiments, the processing module 130 may control the communication module 160 to generate a notification or an alarm instruction, or control the driver module to automatically close the door based on the result that the door has the first preset action followed by the holding action (e.g., not followed by the second preset action within the second preset time). In some embodiments, the processing module 130 may also control the power supply to the sensing modules 120 (e.g., gyroscope, accelerometer, etc.).

In some embodiments, the processing module 130 may send feedback information, generate a notification or an alarm instruction to the user through the communication module 160. For example, after the processing module 130 determines that the door has not been closed within 30 seconds after opening the door, it may control the communication module 160 to transmit the current state of the door to the application installed in the mobile smart device held by the user via a network to notify the door state information. In some embodiments, the processing module 130 may establish a connection to a private or public security system in advance. If the processing module 130 determines that the door has not been closed within 30 mins after opening, it may control the communication module 160 to alert the private or public security system based on the current state of the door and/or other abnormal conditions. In some embodiments, a gravity spring may be installed on the door, so that the door may be automatically closed when the door is not closed. The door may generate an alarm to the user to make sure the door is not held by the user but is actually a mistake.

In some embodiments, the network may be any type of wired or wireless network, or combination thereof. Merely by way of example, the network may include a cable network, a wired network, a fiber optic network, a telecommunication network, an internal network, an internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network or the like, or any combination thereof.

It should be noted that the above description regarding the process 300 is merely provided for the purposes of illustration and description, and not intended to limit the scope of application of this specification. For those skilled in the art, various variations and modifications may be made to the process 300 under the teachings of this specification. However, these variations and modifications do not depart from the scope of this specification. The specific embodiments of the present specification have been described above. Other embodiments do not depart from the scope of the following claims. In some cases, the actions or steps recited in the claims may be performed in a different order than in the embodiments and may still achieve the desired result. In addition, the processes depicted in the figures do not necessarily require the particular order shown or sequential order to achieve the desired results.

It should be noted that the description of the method for generating the matching threshold table method by the process is merely provided for the example and explanation, and not intended to limit the scope of application of the present disclosure. For those skilled in the art, under the teachings of the present disclosure, various variations and modifications may be made to the process to generate a matching threshold table method line. However, those variations and modifications do not depart from the scope of the present disclosure.

Figure 4A:
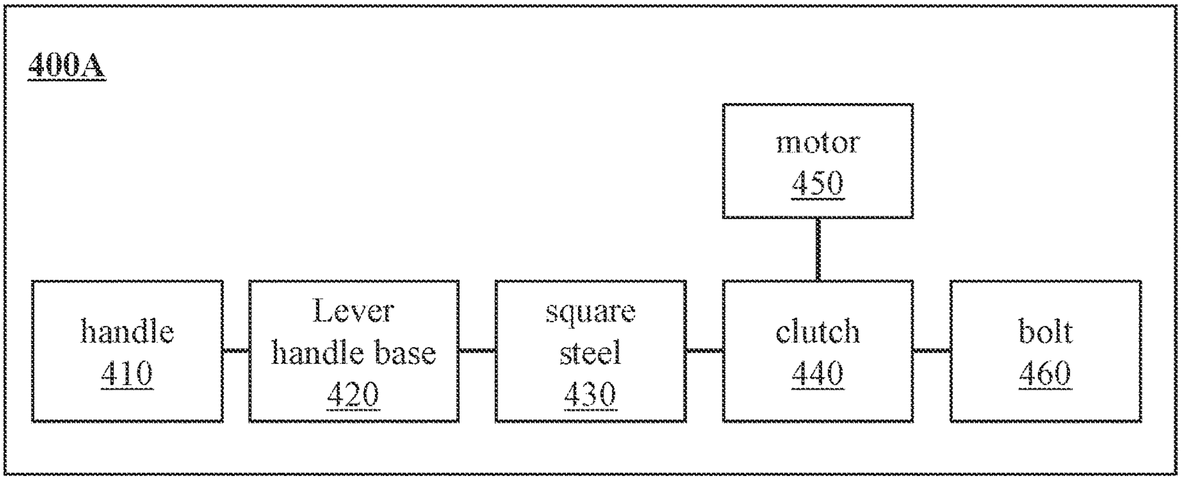
FIG. 4A is a schematic diagram of an exemplary structure of a smart door lock according to some embodiments of the present disclosure.

FIG. 4A is a schematic diagram illustrating an exemplary structure of a smart door lock 400A according to some embodiments of the present disclosure. The smart door lock 400A may be an exemplary embodiment of the smart door lock 100 described in FIG. 1. The smart door lock 400A may be a smart door lock with a clutch device. As shown in FIG. 4A, the smart door lock 400A may include a handle 410, a lever handle base 420, a square steel 430, a clutch device 440, a motor 450, and a bolt 460. In some embodiments, the bolt 460 may include a latch bolt and/or a dead bolt. The handle 410 may be physically connected to the lever handle base 420, and the lever handle base 420 may be physically connected to the square steel 430. When the handle 410 is pressed down, the lever handle base 420 may be driven to rotate, which may drive the square steel 430 to move away from the keyhole (not shown). When the handle 410 is lifted up, the lever handle base 420 may be driven to rotate oppositely, which may drive the square steel 430 to move towards the keyhole. The clutch device 440 may be a component for transmitting power between the square steel 430 and the bolt 460. When the clutch device 440 is connected to the square steel 430 and the bolt 460, the square steel 430 and the bolt 460 may be physically connected through the clutch device 440, that is, the square steel 430 may drive the bolt 460 to move. Specifically, when the clutch device 440 is connected to the square steel 430 and the bolt 460, the power generated when pressing down the handle 410 may be transmitted to the bolt 460 (include a dead bolt and/or a latch bolt) through the lever handle base 420, the square steel 430, and the clutch device 440, and drive the bolt 460 to retract. The power generated when lifting up the handle 410 may be transmitted to the bolt 460 (include a dead bolt and/or a latch bolt) through the lever handle base 420, the square steel 430, and the clutch device 440, and may drive the bolt 460 to project. The projected latch bolt may be pressed to retract by the door frame during the door closing action, and then project to a concave slot when the door is eventually in a closed position. The projected latch bolt may not be pressed to retract by the door frame during the door opening action. The projected dead bolt may not be pressed to retract by the door frame during either the door closing action or the door opening action. When the clutch device 440 is disconnected from the square steel 430 and/or the bolt 460, the square steel 430 may not be connected to the bolt 460, that is, the square steel 430 cannot drive the bolt 460 to move. Specifically, when the clutch device 440 is disconnected from the square steel 430 and/or the bolt 460, the power generated when pressing down the handle 410 may not be transmitted to the bolt 460 (include a dead bolt and/or a latch bolt), that is, the bolt 460 may not be driven to retract, and the door may be locked (e.g., the user cannot directly open the door from outside).

The motor 450 may be configured to drive the connecting and disconnecting of the clutch device 440. After receiving an unlock instruction from the processing module 130, the driving module 140 may drive the motor 450 to rotate (e.g., the driving motor 450 rotates forward) to drive the clutch device 440 to be connected. If the user presses down the handle 410 outside the door, the bolt 460 (e.g., the dead bolt and/or the latch bolt) may be driven to retract, and the door may be unlocked (e.g., the user can directly open the door from outside). After receiving a lock instruction sent from the processing module 130, the driving module 140 may drive the motor 450 to rotate (e.g., the driving motor 450 rotates reverse) to drive the clutch device 440 to be disconnected. If the user presses down the handle outside the door, the bolt 460 (e.g., the dead bolt and/or the latch bolt) may not be driven to retract, and the door may be locked (e.g., the user cannot directly open the door from outside). In some embodiments, the motor 450 may be replaced by other mechanical switches or electronic switches, and the driving module 140 may control the mechanical switches or electronic switches to close or open to control the connecting and disconnecting of the clutch device 440 accordingly.

Figure 4B:
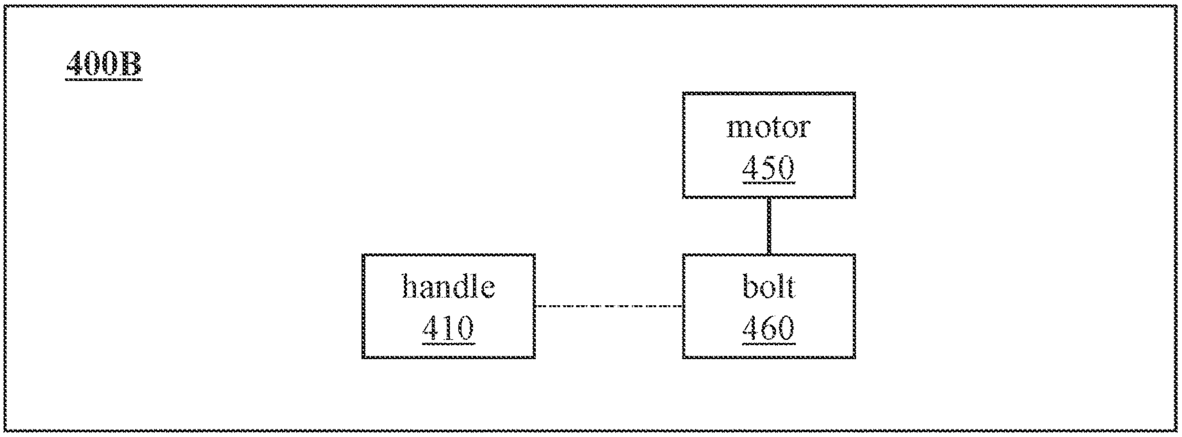
FIG. 4B is a schematic diagram of an exemplary structure of another smart door lock according to some embodiments of the present disclosure.

FIG. 4B is a schematic diagram illustrating an exemplary structure of another smart door lock 400B according to some embodiments of the present disclosure. The smart door lock 400B may be an exemplary embodiment of the smart door lock 100 described in FIG. 1. The smart door lock 400B may be a smart door lock without a clutch device. As shown in FIG. 4B, the smart door lock 400B may include a handle 410, a motor 450, and a bolt 460. In some embodiments, the bolt 460 may include a latch bolt and a dead bolt. The projected latch bolt may be pressed to retract by the door frame during the door closing action, and then project to a concave slot when the door is eventually in a closed position. The projected latch bolt may be pressed to retract by the door frame during the door opening action, and then project after the door panel leaves the door frame. The projected dead bolt may not be pressed to retract by the door frame during either the door closing action or the door opening action. The handle 410 may be fixedly connected to the housing (not shown) of the smart door lock 400B (cannot be pressed down or lifted up). The handle 410 may not be connected to the bolt 460, that is, the handle 410 cannot control the movement of the bolt 460. The motor 450 may directly drive the bolt 460 to project or retract. Specifically, when receiving an unlock instruction from the processing module 130, the driving module 140 may drive the motor 450 to rotate (e.g., in a forward direction) to drive the bolt 460 to retract, and the user can then open the door from outside. When receiving a lock instruction from the processing module 130, the driving module 140 may drive the motor 450 to rotate (e.g., in a backward direction) to drive the bolt 460 to project, and the user may not open the door from outside.

Figure 5A:
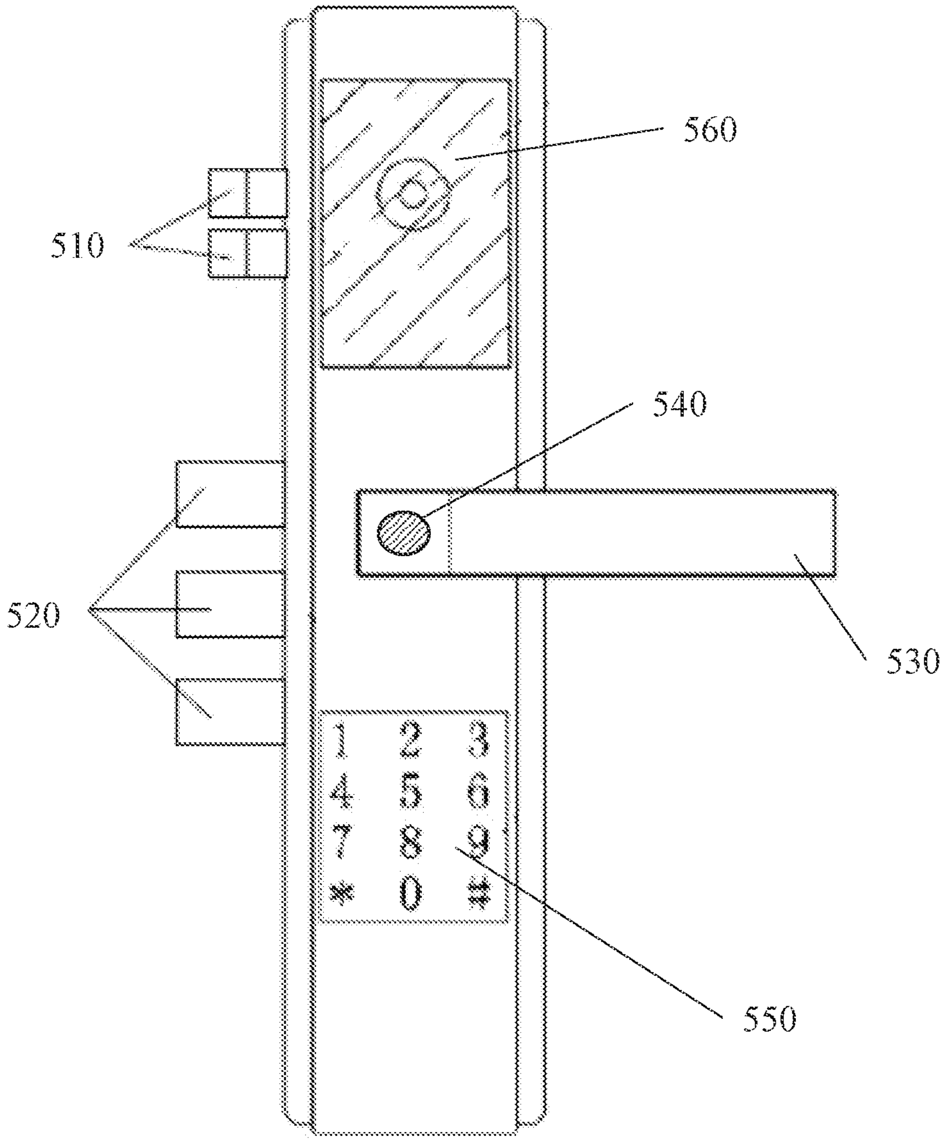
FIG. 5A is a schematic diagram of an exemplary state of a smart door lock according to some embodiments of the present disclosure.
Figure 5B:
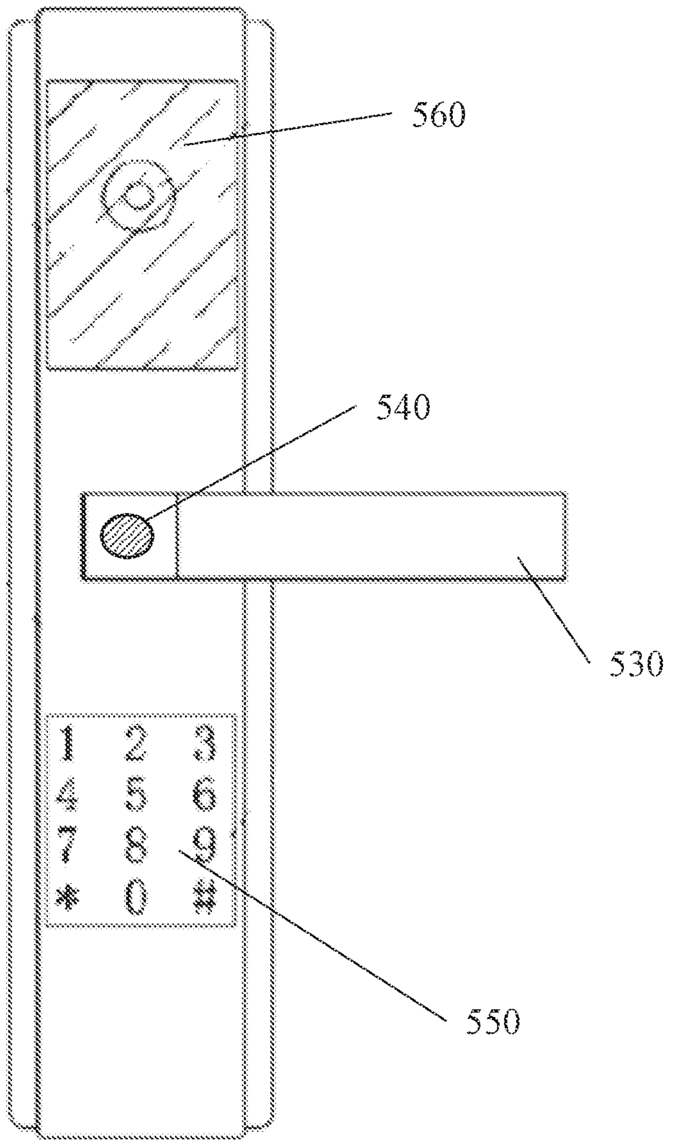
FIG. 5B is a schematic diagram of another exemplary state of a smart door lock according to some embodiments of the present disclosure.

FIG. 5A is a schematic diagram illustrating an exemplary state of a smart door lock 500 according to some embodiments of the present disclosure. FIG. 5B is a schematic diagram illustrating another exemplary state of the smart door lock 500 according to some embodiments of the present disclosure. In some embodiments, the smart door lock 500 may include a latch bolt 510, a dead bolt 520, a handle 530, a fingerprint identification device 540, a password input device 550, and an electromagnetic induction device 560. As shown in FIG. 5A, the latch bolt 510 and the dead bolt 520 of the smart door lock 500 are both projected. As shown in FIG. 5B, the latch bolt 510 and the dead bolt 520 of the smart door lock 500 are both retracted. The fingerprint identification device 540, the password input device 550, and the electromagnetic induction device 560 are exemplary embodiments of the identification information acquisition unit 111 described in FIG. 1. The fingerprint identification device 540 may be configured to obtain the user's fingerprint information, finger vein information, etc. The password input device 550 may be configured to obtain the user's password information. The electromagnetic induction device 560 may be configured to obtain IC card information of the user. More descriptions regarding the fingerprint identification device 540, the password input device 550, and the electromagnetic induction device 560 may be found elsewhere in the present disclosure. See, e.g., FIG. 1 and relevant descriptions thereof.

If the smart door lock 500 has a clutch device, its structure may be the same as the smart door lock 400A described in FIG. 4A. The projected latch bolt may be pressed to retract by the door frame during the door closing action, and then project to a concave slot when the door is eventually in a closed position. The projected latch bolt may not be pressed to retract by the door frame during the door opening action. The projected dead bolt may not be pressed to retract by the door frame during either the door closing action or the door opening action. More descriptions regarding the smart door lock with a clutch device may be found elsewhere in the present disclosure. See, e.g., FIG. 4A and relevant descriptions thereof.

If the smart door lock 500 does not have a clutch device, its structure may be the same as the smart door lock 400B described in FIG. 4B. The projected latch bolt may be pressed to retract by the door frame during the door closing action, and then project to a concave slot when the door is eventually in a closed position. The projected latch bolt may be pressed to retract by the door frame during the door opening action, and then project after the door panel leaving the door frame. The projected dead bolt may not be pressed to retract by the door frame during either the door closing action or the door opening action. The handle 530 may be fixedly connected to a lever handle base (not shown). More descriptions regarding the smart door lock without a clutch device may be found elsewhere in the present disclosure. See, e.g., FIG. 4B and relevant descriptions thereof.

Figure 6:
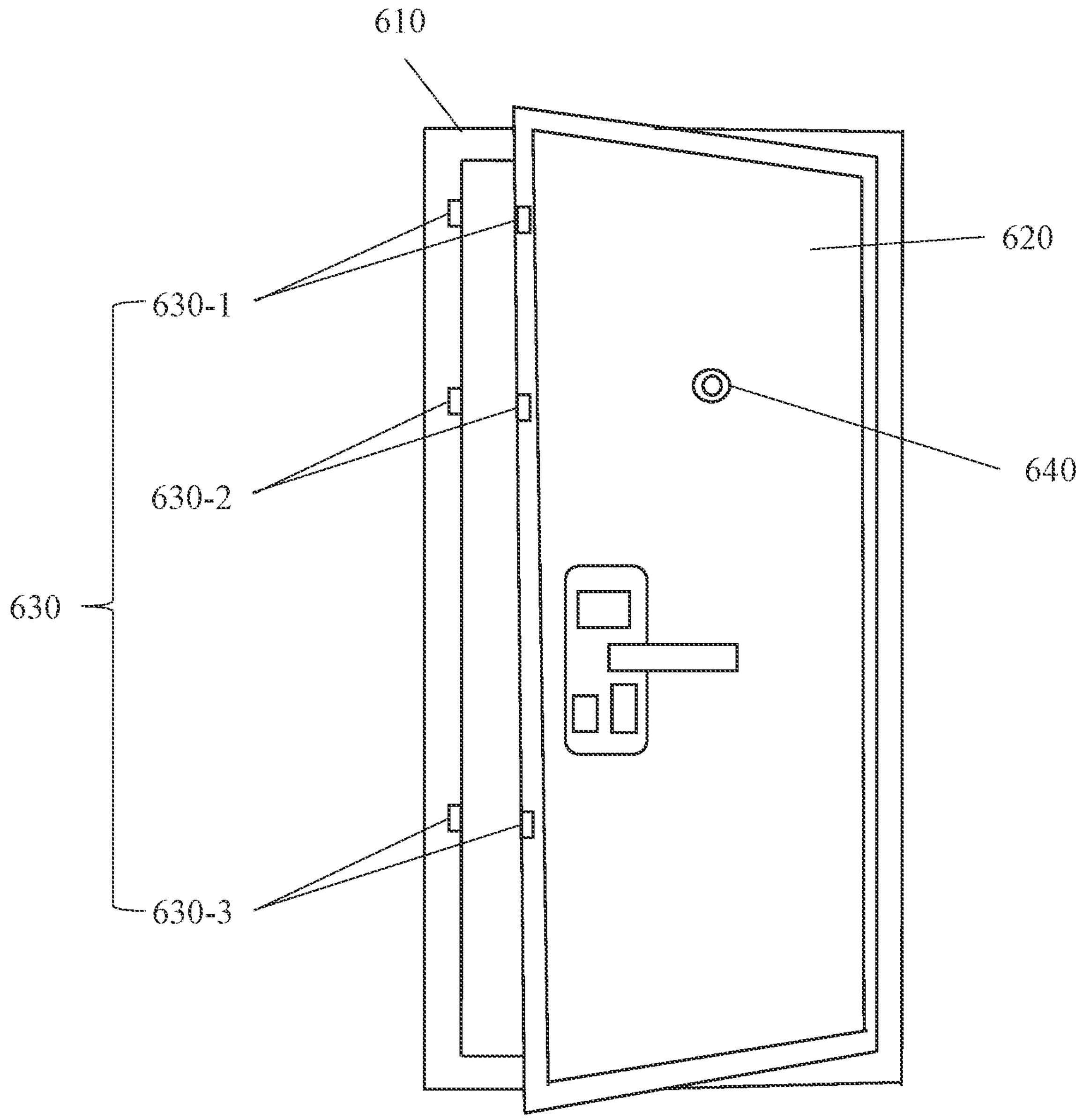
FIG. 6 is a schematic diagram of an exemplary installation position of a sensor of the smart door lock according to some embodiments of the present disclosure.

FIG. 6 is a schematic diagram illustrating an exemplary installation position of a sensor of the smart door lock according to some embodiments of the present disclosure. The sensor 630 may be an exemplary embodiment of the sensing module 120 described in FIG. 1.

As shown in FIG. 6, the sensor 630 may be configured to detect a change in the relative position of the door panel and the door frame (e.g., the door panel changes from a state of pressing the door frame to a state of leaving the door frame, or the door panel changes from a state of leaving the door frame to a state of pressing the door frame). The sensors 630 may include but not limited to an infrared sensor, a reed sensor, a contact sensor, a pressure sensor, or the like, or any combination thereof. In some embodiments, the sensor 630 may include a group of sensors 630-1, 630-2, 630-3, or the like. The sensors 630-1, 630-2, and 630-3 may be of the same or different types. Each of the sensors 630 may include two components, which may be mounted on the door frame 610 and the door panel 620 respectively. For example, the infrared sensors may include an infrared signal emitter and an infrared signal receiver. As another example, the reed sensor may include a magnet and a reed sensing component. As another example, the contact sensor may include a touch sensing component and a component worked in pair with the touch sensing component. When the door panel 620 contacts or presses the door frame 610, the two components may establish a connection and generate a connection signal. The connection may include but not limited to an infrared connection, a magnetic field connection, a contact connection, or the like. The connection signal may include but not limited to an infrared signal, a magnetic field signal, a pressure signal, an electrical signal, or the like. When the relative position of the door panel 620 and the door frame 610 changes, the connection signal may change accordingly. For example, when the door panel changes from pressing the door frame to leaving the door frame, the connection between the two components may be interrupted, and the connection signal may reduce from a high level to a low level. At this time, the processing device (e.g., the processing module 130) may determine that a door opening action has occurred. Conversely, when the door panel changes from leaving the door frame to pressing the door frame, the connection between the two components may be restored, and the connection signal may increase from a low level to a high level. At this time, the processing device (e.g., the processing module 130) may determine that a door closing action has occurred.

The vision sensor 640 may be fixedly mounted on the door panel 620 and configured to obtain image or video data of the area directly opposite to the door panel 620. If the image or video data collected by the vision sensor 640 has not changed within a period of time, the processing device (e.g., the processing module 130) may determine that no door opening action or door closing action has occurred. Conversely, if the image or video data collected by the vision sensor 640 changes over a period of time, the processing device (e.g., the processing module 130) may determine that a door opening action or door closing action has occurred. Specifically, the vision sensor 640 may collect in advance at least one group image or video data of the area directly opposite to the door panel 620 from the closed position to the maximum open position of the door panel 620. The image or video data may be stored in a storage device (e.g., the storage module 150). A processing device (e.g., the processing module 130) may compare the currently acquired image or video data with the previously acquired image or video data and determine a state and/or an action of the door (e.g., a door opening action, a door closing action, a holding action, etc.). In some embodiments, the vision sensor 640 may also be used to implement the image acquisition related functions of the identification information acquisition unit 111 described in FIG. 1.

An orientation sensor (not shown) may be installed on the door panel 620 and configured to sense the position of the door panel 620. In some embodiments, the orientation sensor may include but not limited to a gyroscope sensor, an accelerometer, a geomagnetic sensor, or the like. The gyroscope sensor may sense the direction and magnitude of the angular velocity during the movement of the door panel 620, to determine a state and/or an action of the door. In some embodiments, the gyroscope may determine the angle change of the door panel 620 in any time period (e.g., 5 seconds, 10 seconds, 20 seconds, 30 seconds) based on the angular velocity in the time period. For example, the gyroscope may perform an integration calculation on the angular velocity within a specific time period (e.g., the time period of the door opening process, or the time period of the door closing process) to obtain the change in the angle of the door panel 620 within the specific time period (e.g., the time period of the door opening process, or the time period of the door closing process). In some embodiments, the processing module 130 may store the angle change of the door panel 620 in any time period in the storage module 150.

In some embodiments, the processing module 130 may determine the angle of the door panel 620 after any time period based on the current angle of the door panel 620 and the angular velocity within any time period. For example, the door panel 620 is at the closed position and the current angle of the door panel 620 is 0 degree, the processing module 130 may obtain an opening angle of the door panel 620 after any time period by performing an integration calculation on the angular velocity during the time period of the door opening process, and adding the current angle of the door panel 620 to the opening angle of the door panel 620 within any time period to obtain the angle of the door panel 620. As another example, the door panel 620 is in the open position and the current angle of the door panel 620 is a first angle, the processing module 130 may obtain a closing angle of the door panel 620 after any time period by performing a integration calculation on the angular velocity during the time period of the door closing process, and deducting the closing angle of the door panel from the first angle 620 to obtain the angle of the door panel 620.

In some embodiments, the processing module 130 may determine the state of the door based on the angle of the door panel 620 detected by the gyroscope sensor. For example, if the angle of the door panel 620 detected by the gyroscope sensor is less than 2 degrees, the processing module 130 may determine that the door is in a closed position. As another example, if the angle of the door panel 620 detected by the gyroscope sensor is greater than 2.35 degrees, the processing module 130 may determine that the door is in an open position.

The pressure sensing unit 126 may also include an air pressure sensor. The air pressure sensor may be configured to sense the air pressure change on the surface of the door panel 620. If the air pressure sensor senses that the air pressure on the outer surface of the door panel 620 decreases, a processing device (e.g., the processing module 130) may determine that the door has a door closing action. Conversely, if the air pressure sensor senses that the air pressure on the outer surface of the door panel 620 increases, a processing device (e.g., the processing module 130) may determine that the door has a door opening action. If the air pressure sensor senses that the air pressure on the outer surface of the door panel 620 does not change, a processing device (e.g., the processing module 130) may determine that the door is stationary (that is, the door is closed or the door is held after being opened to a certain position).

Figure 7:
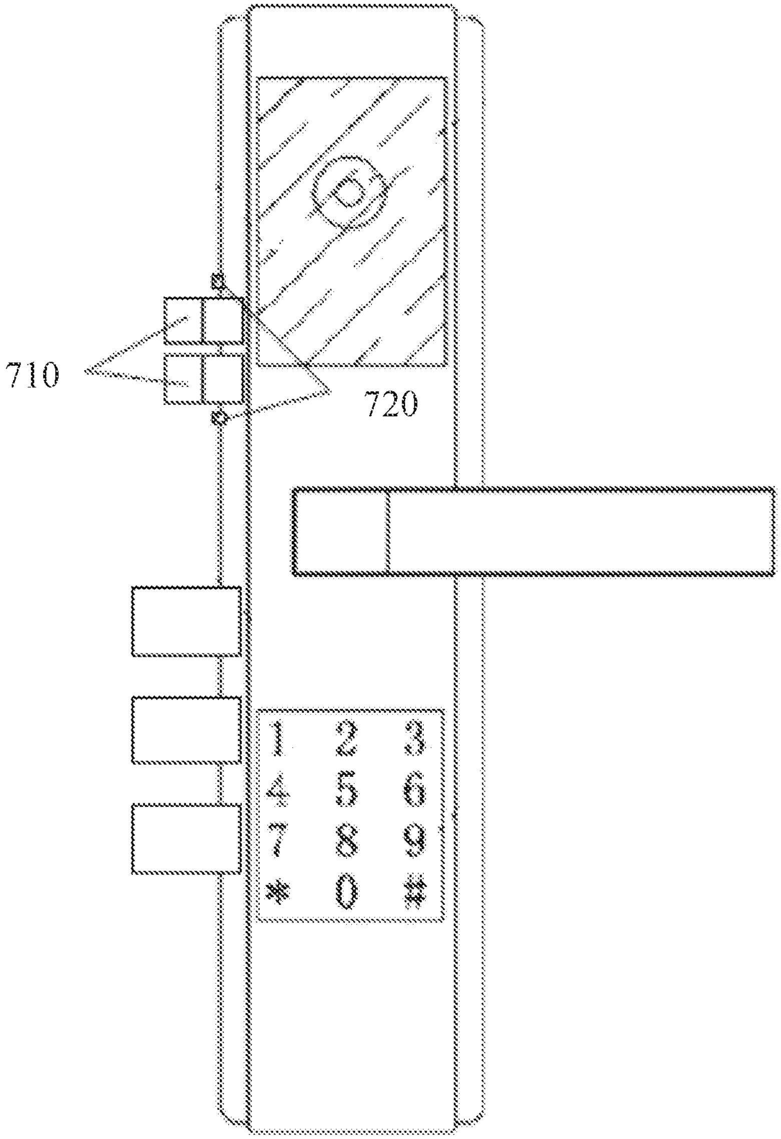
FIG. 7 is a schematic diagram of another exemplary installation position of a sensor of the smart door lock according to some embodiments of the present disclosure.

FIG. 7 is a schematic diagram illustrating another exemplary mounting position of a sensor of the smart door lock according to some embodiments of the present disclosure. As shown in FIG. 7, a sensor 720 (e.g., two components of the sensor 720) may be mounted on both sides of the bolt 710 and configured to sense the movement of the bolt 710. The bolt 710 may have the same structure and function as the latch bolt 510 or the dead bolt 520 described in FIG. 5. The sensor 720 may have the same function as the sensor 630 described in FIG. 6. The sensor 720 may include two components, which may be mounted on two sides of the bolt 710 respectively. When the bolt 710 retracts, the two components may establish a connection and generate a connection signal. The connection may include but not limited to an infrared connection, a magnetic field connection, or the like. The connection signal may include but not limited to an infrared signal, a magnetic field signal, or an electrical signal. When the bolt retracts or projects, the connection signal may change accordingly. For example, when the bolt 710 projects from a retraction state, the connection between the two components may be interrupted, and the connection signal may reduce from a high level to a low level. At this time, the processing device (e.g., the processing module 130) may determine that a door closing action has occurred. Conversely, when the bolt 710 projects from a retraction state, the connection between the two components may be restored, and the connection signal may increase from a low level to a high level. At this time, the processing device (e.g., the processing module 130) may determine that a door opening action has occurred. The sensor 720 may also count the number of times of projection and/or retraction of the bolt 710, and the processing device (e.g., the processing module 130) may determine whether the door has a preset action (e.g., a retraction after a projection may correspond to a door closing action after a door opening action.

Figure 8:
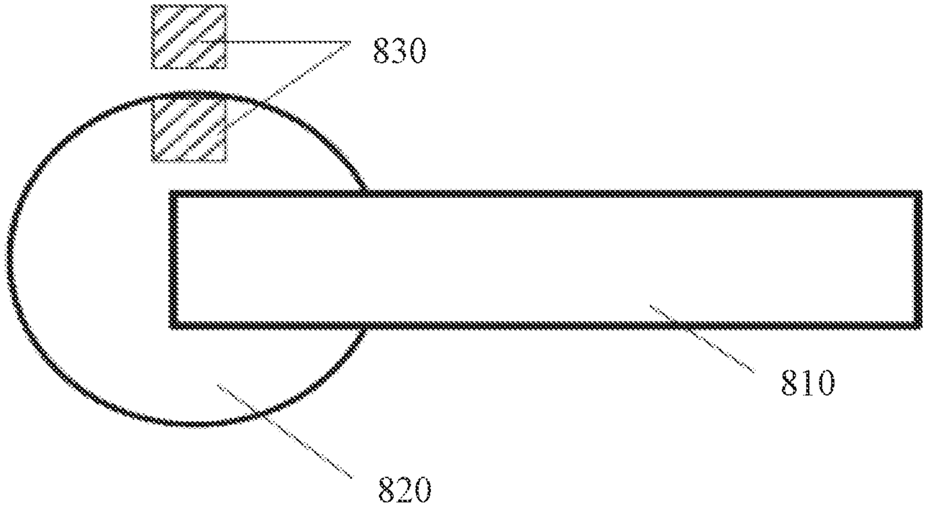
FIG. 8 is a schematic diagram of another exemplary installation position of a sensor of the smart door lock according to some embodiments of the present disclosure.

FIG. 8 is a schematic diagram illustrating another exemplary installation position of a sensor of the smart door lock according to some embodiments of the present disclosure. As shown in FIG. 8, a sensor 830 may be mounted on a smart door lock with a clutch device and used to sense the action of a handle 810. For a smart door lock with a clutch device, the handle 810 may drive the lever handle base 820 to rotate. The sensor 830 may have the same function as the sensor 630 described in FIG. 6. The sensor 830 may include two components, which may be mounted on the lever handle base 820 and a region of the door panel opposite to the lever handle base, respectively. When handle 810 is in an initial position, the two components may establish a connection and generate a connection signal. The initial position refers to a position of the handle 810 without an external force is applied. The connection may include but not limited to an infrared connection, a magnetic field connection, or the like. The connection signal may include but not limited to an infrared signal, a magnetic field signal, or an electrical signal. When a state of the handle 810 changes, the connection signal may change accordingly. For example, the handle 810 is pressed down, the lever handle base 820 may rotate, the connection between the two components may be interrupted, and the connection signal may reduce from a high level to a low level. At this time, the processing device (e.g., the processing module 130) may determine that a door opening action has occurred.

Figure 9:
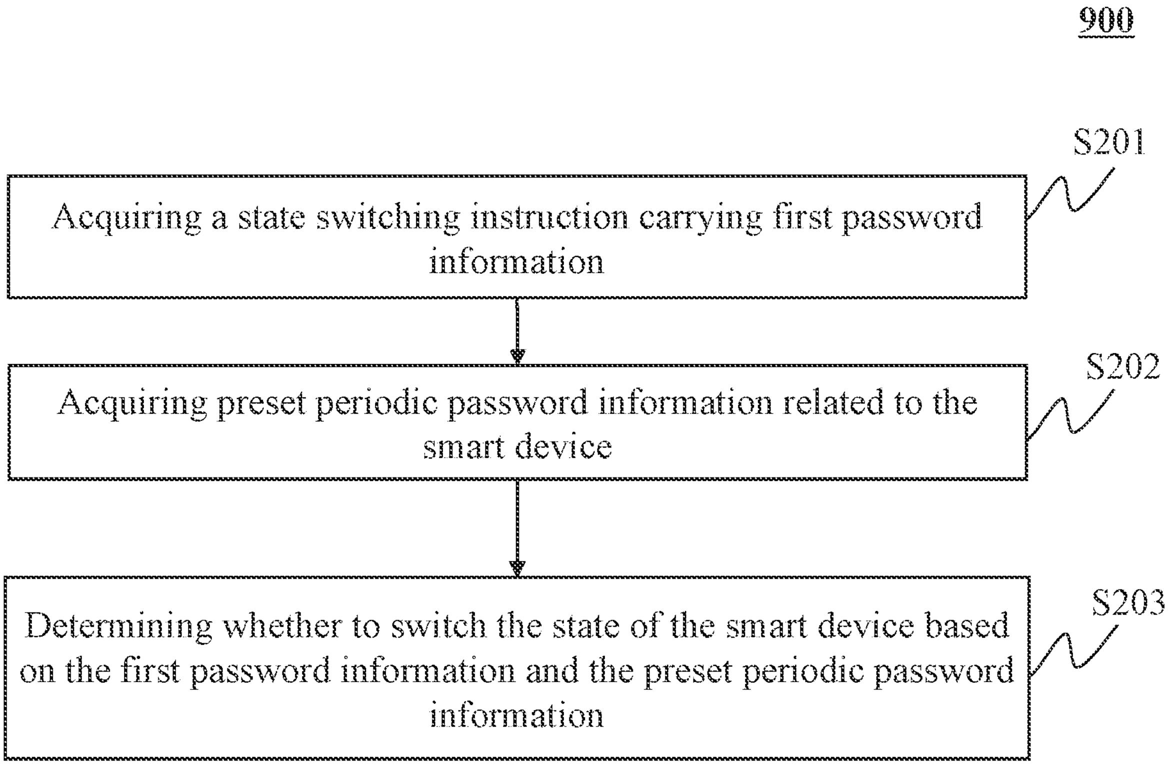
FIG. 9 shows a flowchart of a method for controlling a smart device provided by an embodiment of the present disclosure.

FIG. 9 shows a flowchart of a method for controlling a smart device provided by an embodiment of the present disclosure. In some embodiments, one or more steps in the process 900 may be implemented in a smart device control system including at least a server (or processor), a network, a smart device, and a user terminal. For example, one or more steps in the process 900 may be stored in a storage device in the form of instructions and called and/or executed by one or more processors (e.g., a processor implemented on the user terminal or a processor communicated with the user terminal). In some embodiments, the one or more processors may be the processing module 130 in the smart door lock 100, so the process 900 may be implemented on the smart door lock 100.

In S201, the processor may acquire a state switching instruction carrying (or including) first password information.

In some embodiments, the state switching instruction may be an instruction or command to control the state of the smart device (e.g., the smart door lock 100). In some embodiments, the smart device may be a door lock, a box lock, a cabinet lock, a garage lock, an equipment lock, a vehicle lock, etc. In some embodiments, the state switching instruction may be configured to control the state (e.g., a locked state or an unlocked state) of the smart device based on a password type of a correct password that is entered by a user. The storage device may store different password contents and different password types corresponding to the password contents. Each password type may correspond to a specific state switching instruction. The processor may determine a password type based on the password content entered by the user, and then determine a state switching instruction corresponding to the password content. For example, the state switching instruction may be configured to direct the smart device to switch from a locked state to an unlocked state. As another example, the state switching instruction may be configured to direct the smart device to restore the factory default settings. As yet another example, the state switching instruction may be configured to eliminate a security alert of an alarm device. Alternatively, the user may input information regarding the state switching instruction along with the first password information. For example, the user may first press an "unlock" button, and then enter a password. The processor may determine the state switching instruction to be unlocking the smart device.

In some embodiments, the state switching instruction may also carry (or include) the first password information. In some embodiments, the first password information may include the first password, the smart device identification, the time when the user entered the first password, preset characters, and the like. In some embodiments, the user may include the owner, the manager, or a temporary user of the smart device.

In S202, the processor may acquire preset periodic password information related to the smart device.

In some embodiments, the preset periodic password related to the smart device may include a preset periodic password that is stored on the server or the processor of the smart device. In some embodiments, the preset periodic password remotely set for the smart device can be preset remotely by the owner or manager of the smart device through an electronic device (e.g., a cell phone, a tablet computer, etc.) based on the password content entered by any qualified person (here defined as a user) and the time of use of the password content entered by the user or acquired by an acquiring device. The acquiring device may include, for example, a code keyboard, a touch screen, a camera, a microphone, etc. The password content may include but not limited to a number, a fingerprint, a vein pattern, a sound, and an image (e.g., an image including biological features of a user, such as facial features). After the preset periodic password is generated, the preset periodic password may be sent to the server or a storage device of the smart device. The processor may acquire the preset periodic password information from the server or the storage device.

In some embodiments, the smart device may also generate one or more preset periodic passwords based on a built-in algorithm. Alternatively, the periodic password locally set on the smart device by the user is used. Specifically, after the user terminal generates the preset periodic password, the password needs to be sent online or offline to a smart device that is communicatively connected to the user terminal. For example, taking a user terminal and a door lock (e.g., the smart door lock 100 shown in FIG. 1) connected with it as an example, the connection method between the two can be NFC, Bluetooth network connection, etc., or LAN, GPRS, ZigBee network, etc. When the user terminal sends the password to the door lock, not only can the password be sent online through these connection methods, but also the generation and verification of the password can be done offline. In the case of offline password sending, an activation code or function code can be added to the beginning of the offline password generated by the user terminal to activate the related functions of the smart door lock, so that the user can add a periodic password to the smart door lock and then be able to control the state of the smart door lock. The specific contents and format of the activation code or function code can be selected depending on the actual situation, which are not limited to the embodiments of the present disclosure.

In some embodiments, the password content entered by the user or acquired by an acquiring device is used to control the smart device. For example, the password content may be one of a number, a fingerprint, a sound, and an image that can control the smart device. In some embodiments, in order to acquire preset periodic password information related to the smart device, the smart device control system may receive the password content input by the user and the time of use of the password content input by the user, in which the time of use of the password content denotes that the password content is allowed to be valid once at a specific time interval (or each time when a predetermined time has passed), and limits the range of the time of use of the once effective password content; then, a password can be generated based on the password content, the time of use of the password content, and attribute information. The attribute information may be used for verifying whether the password is within the range of the time of use in which the password is effective once when control of the smart device is performed based on the password. The attribute information may include at least one of the following: the generation time of the periodic password information, the first working time of the periodic password, the effective period of the periodic password, a suspending duration, etc.

The preset periodic password may start to be valid for the first time at the first working time. The first working time may be set by the user. In some embodiments, the first working time may be used to determine whether the input time of the first password information conforms to the time of use of the preset periodic password. For example, when the user sets the preset periodic password on Monday, the user may set the first working time as Sunday, and a periodic time interval included in the time of use of the periodic password may be set as two weeks. Then the preset periodic password may be valid for the first time on Sunday, and be valid on Sunday each time after two weeks have passed. In some embodiments, the processor may set the first working time to be the same as the generation time of the periodic password according to a default setting or a user instruction.

The effective period of the periodic password indicates a period in which the periodic password can be used (but not necessarily be valid). The preset periodic password is invalid (or expired) outside the effective period. For example, if the password validity period of a preset periodic password is 2018 Oct. 15-2018 Nov. 15 but the local time is 2018 Nov. 16, it means that the preset periodic password has expired and is invalid. In some embodiments, the processor may delete the expired preset periodic password.

The suspending duration indicates a period in which the periodic password is temporarily invalid. For example, when a house owner cancels the regular house cleaning service during a particular period but wants the regular house cleaning service to continue after the particular period, the house owner may set the particular period as the suspending duration. In the suspending duration, the preset periodic password is set to be a suspending state and remains invalid even during the time of use of the preset periodic password. If an inputted password content is the same as the preset password in the suspending duration, the processor may determine that the inputted password content is incorrect, and the state switching instruction may be rejected. After the suspending duration, the preset periodic password is set to be valid during the time of use.

Taking the smart device as the first electronic device as an example, the password content can be acquired through the first electronic device and the first electronic device can be controlled based on the password content. Alternatively, the smart device may be a second electronic device that can communicate with the first electronic device, for example, directly or via a relay device (e.g., a server) so that the first electronic device can acquire the preset periodic password and send it to the second electronic device. The preset periodic password may be valid once at a specific time interval or each time after a predetermined time has passed. For more details about the generation process of the preset periodic password, refer to FIG. 10 and its related description, which will not be repeated here.

In some embodiments, the predetermined time may be a fixed time period, such as specific months, weeks, or days. For example, the periodic password may be valid on each Friday, then the predetermined time may be a week. If the periodic password is valid on the 5th of each month, then the predetermined time may be a month. Alternatively, the predetermined time may be a varying period that changes based on a periodic time interval. In some embodiments, the predetermined time may relate to a periodic time interval of specific months and a day number. The day number may indicate one or more specific days within each month, such as the 5th day of the month, the 10th day of the month. In some embodiments, the day number includes information of a weekday number and a week number. The weekday number may indicate one or more specific days within each week, such as Monday, Friday. The week number may indicate a specific week within a month, such as the first week, the second week, etc. Merely by way of example, a specific day number may indicate the Monday of the first week of the month, the Friday of the second week of the month, or the like. The preset periodic password may be valid once, during the time range on one or more days corresponding to the day number, each time after the specific months have passed. For example, when the periodic time interval of specific months is two months, the day number indicates the Monday of the first week of each month, and the time range is 5:00 p.m. to 7 p.m., the preset periodic password may be valid between 5:00 p.m. to 7 p.m. on Monday of the first week of a corresponding month each time after two months have passed. Similarly, the predetermined time may relate to a periodic time interval of specific weeks and a weekday number. The preset periodic password may be valid on preset periodic password becomes valid once, during the time range on one or more days corresponding to the weekday number, each time after the specific weeks have passed. The predetermined time may also relate to a periodic time interval of specific days. The preset periodic password may be valid once, during the time range on one or more days, each time after the specific days have passed.

In S203, the processor may determine whether to switch the state of the smart device based on the first password information and the preset periodic password information.

In some embodiments, the smart device may determine whether to switch the state of the smart device based on the first password information and the preset periodic password information. In some embodiments, the smart device may also determine whether to switch the state of the smart device based on the first password information and its attribute information and the preset periodic password and its attribute information. Specifically, the first password information and the preset periodic password information may be compared, and based on the comparison result, it is determined whether to switch the state of the smart device. If the input password (that is, the first password) is the same as the preset periodic password, the first input time of the input password is acquired; if the first input time is within the range of the time of use of the once effective preset periodic password, the state of the smart device is switched based on the input password (for example, the smart device is controlled to switch from the current state to another state (for example, from the off state to the on state)); on the contrary, if the first input time is not within the range of the time of use of the once effective preset periodic password, the state of the smart device will not be controlled. For more details about determining whether to perform state control on the smart device, refer to FIGS. 10-13 and related descriptions, which will not be repeated here.

In some embodiments, a periodic password may be convenient for periodic events related to a need of state switching of the smart device, and a user may be to deal with different situations according to their needs using the periodic password. For instance, cleaning workers may come to the house regularly to do cleaning work. If the user informs the cleaning workers of the password to unlock the door, then the cleaning workers can come to the house even when the user is not at home. The periodic password is only valid at the time of use defined by the user so that the user does not have to worry about safety issues. If the cleaning workers come every other week on Friday morning, the user may set the use of the time of the periodic password as every other week's Friday morning from 9:00 a.m. to 11:30 a.m. As another example, the smart device may be a computer. A parent may use the periodic password to manage the use of the computer by a kid. By setting the time of use of the periodic password to every Saturday and Sunday from 9:00 a.m. to 9:00 p.m., the kid is allowed to unlock the computer and use the computer only on weekends, as required by the parent.

In some embodiments, the first password information included in the state switching instruction may be related to a specific user. Different users may use different password contents to unlock the smart devices. Therefore, the identity of the user may be recognized based on the password content entered by the user or acquired by an acquiring device. For example, the processor may compare the password content of the first password information with a set of preset passwords. If the password content of the first password information is the same as a preset password A, then the processor may determine that user A is attempting to control or change the state of the smart device.

In some embodiments, a user may use a mobile terminal to retrieval one or more unlocking records of a smart device such as a smart lock. For example, the mobile terminal may be operably connected to the smart lock through the Internet. In response to a retrieval request from the mobile terminal, the smart lock may retrieve and transmit one or more records (e.g., unlocking records, abnormal event records) of the smart lock to the mobile terminal. Exemplary unlocking records may include: an unlocking mode (e.g., in response to a verification codec input through the keypad, in response to a verification code received from a mobile terminal through Bluetooth, in response to a verification code received from a mobile terminal through NFC), an unlocking time, the identity of the person who is unlocking or has unlocked the smart lock, etc. The abnormal event records may correspond to a plurality type of events, such as password error a usage count of password exceeding a threshold, generating a warning notification, or the like, or any combination thereof. Exemplary abnormal event records may include an event type (e.g., password error), a time of the event (e.g., a start time of an event), or the like, or a combination thereof. In some embodiments, data related to the unlocking records may be uploaded to a cloud server through a mobile terminal operably connected to the smart lock. The connection between the mobile terminal and the smart lock may be established based on a wired connection or a wireless connection.

In some embodiments, second password information is carried (or included) in the state switching instruction. After the preset permanent password information related to the smart device is acquired, if the second password information is the same as the preset permanent password, the state of the smart device can be switched based on the second password information. The preset permanent password is permanently valid password information preset on the server or processor.

In some embodiments, the third password information is carried in the state switching instruction. After the preset one-time password information related to the smart device is acquired, if the third password information is the same as the preset one-time password, the second input time of the third password information is acquired. If the second input time is within the range of the time of use of the preset one-time password, the state of the smart device can be switched based on the input password, and the preset one-time password is once valid password information preset on the server or processor. In some embodiments, the first password information, the second password information, and the third password information may be collectively referred to as use information.

In some embodiments, the state switching instruction may include just one set of password information related to a user input. As used herein, the terms "first password information", "second password information", and "third password information" may refer to the same password information included in the state switching instruction. Use of the terms "first password information", "second password information", and "third password information" is merely intended for the convenience of describing the password information corresponding to different password types (e.g., a periodic password, a permanent password, or a one-time password).

It should be noted that the foregoing description of the process 900 is only for example and description, and does not limit the scope of the present disclosure. For those skilled in the art, various modifications and changes can be made to the process 900 under the guidance of the present disclosure. However, these modifications and changes are still within the scope of the present disclosure. In some embodiments, by determining whether to switch the state of the smart device based on the first password information and the preset periodic password information, the control of the smart device based on the periodic password can be realized, which satisfies the user requirement of controlling the smart device once at a specific time interval.

Figure 10:
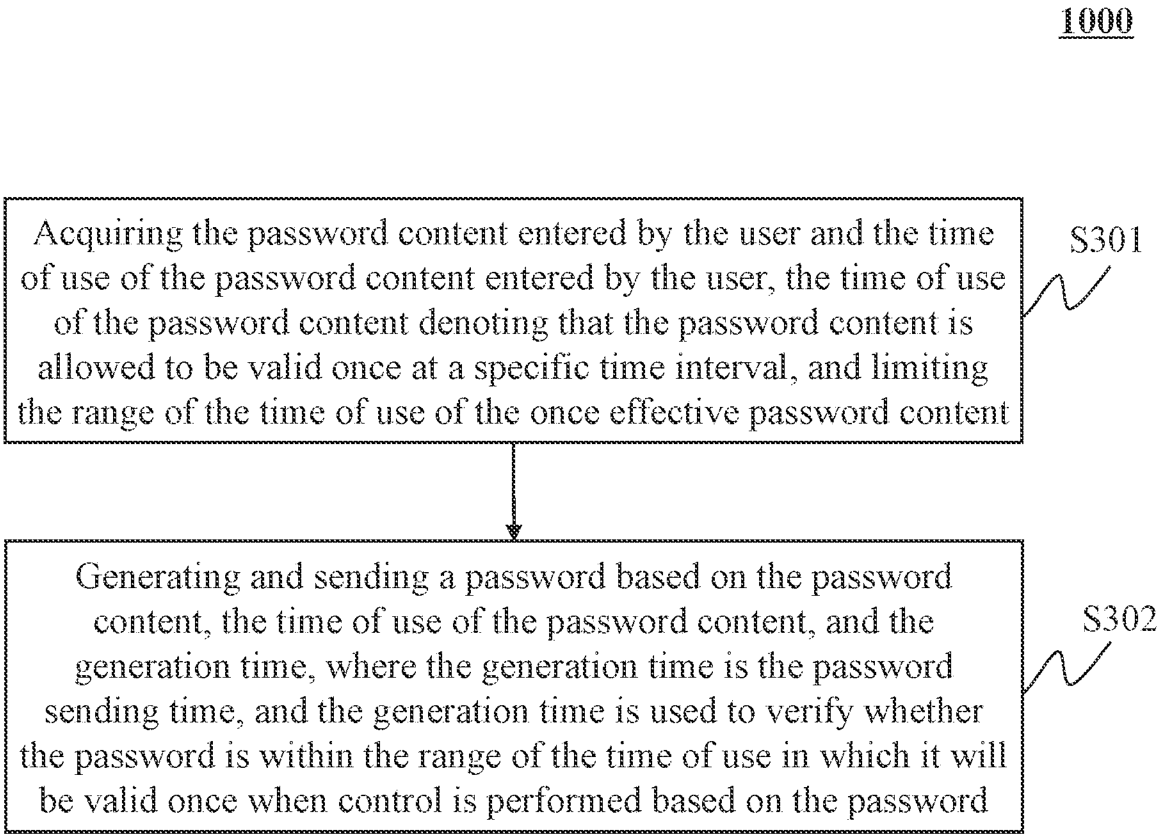
FIG. 10 is a flowchart of a password generation method provided by an embodiment of the present disclosure.

FIG. 10 shows a password generation method provided by an embodiment of the present disclosure, which is applied to a first electronic device (e.g., a user terminal including such as a smart cell phone, a tablet computer, a notebook computer, a desktop computer, a smart watch, etc.) for generating a password (i.e., a preset periodic password) with a time of use, so that the password with the time of use meets the user requirement of controlling the controlled device (e.g., the smart door lock 100 in FIG. 1) at a certain interval. The process 1000 is as shown in FIG. 10 and can include the following steps.

In S301, the processor may acquire the password content entered by the user (or acquired by an acquiring device) and the time of use of the password content entered by the user, the time of use of the password content denoting that the password content is allowed to be valid once at a specific time interval (or each time after a predetermined time has passed), and limiting the range of the time of use of the once effective password content.

It can be understood that the password content is used to control the controlled device (e.g., the smart door lock 100 shown in FIG. 1) if the password content is determined to be valid. For example, the password content may be at least one of a number, a fingerprint, a vein pattern, a sound, and an image (e.g., an image including biological features of a user, such as facial features) that can control the controlled device. The device may be a first electronic device. That is, the password content is acquired through the first electronic device and the first electronic device is controlled based on the password content. Alternatively, the device may be a second electronic device capable of communicating with the first electronic device, for example, a second electronic device communicating with the first electronic device directly or via a relay device, so that the first electronic device can acquire the password content and send it to the second electronic device.

And while acquiring the password content, the processor also acquires the time of use of the password content. The time of use of the password content is used to limit the password content to be effective for many times periodically. In some embodiments, the so-called "effective for many times periodically" means taking effect (or being valid) once every a specific time (the specific time denotes the repetition interval) and the range of the time of use in which it will be valid once.

In some embodiments, the password content may be valid each time after a predetermined time has passed. The predetermined time may be a fixed duration or a varying duration, as described in connection with operation S202.

In some embodiments, the specific time interval may be one of specific months, specific weeks, and specific days. The range of the time of use of being effective once depends on the specific time interval. For example, if the time of use of the password content denotes that the password content is allowed to be valid once every specific months, the time of use of the password content also limits the date (or day number) when it will be valid once and the single-day effective time. The date when it will be valid once and the single-day effective time limit the range of the time of use in which it will be valid once. In other words, the time of use of the password content may also limit the date when the password content becomes effective in the specific months and the effective time at that date, in addition to the limitation that the repetition interval is specific months. The "specific months" is used to indicate the number of months as an interval.

For example, the interval of specific months can be any one from one month to N months, where N is a natural number and the value of N is greater than or equal to 1, and the date can be at least one of the 1st, 2nd, 3rd, . . . , and 31st. The date can be multiple days or a single day. For example, the date is the 1st, or the dates are the 1st, the 2nd and the 3rd. The single-day effective time is the effective time corresponding to the effective date, which is limited by the start time and the end time. If there are multiple dates when it will be valid once, the single-day effective times of the multiple dates can be the same or different. For example, the single-day effective time may be one or more hours, and the single-day effective time may also be specifically limited to minutes and seconds. Alternatively, a unified time is set for the single-day effective time. For example, the single-day effective time may be set to 13:00-19:00, so that it is unnecessary to enter the single-day effective time each time the time of use is entered. The specific settings of specific months, dates and single-day effective time will be determined by the user independently, and will not be explained here.

If the time of use of the password content denotes that the password content is allowed to be valid once every specific weeks, the time of use of the password content also limits on which day of a week it will be valid once and the single-day effective time, which limit the range of the time of use in which it will be valid once. In other words, the time of use of the password content may also limit on which day of a week in the specific weeks the password content is made effective and the effective time on that day, in addition to the limitation that the repetition interval is specific weeks. The "specific weeks" is used to indicate the number of weeks.

The interval of specific weeks may be one from one week to M weeks, where M is a natural number and the value of M is greater than or equal to 1. The day of a week may represent multiple days or a single day. For example, the day of a week may be one or more from Monday to Sunday. For the description of the single-day effective time, refer to the above description, which will not be repeated In some embodiments.

If the time of use of the password content denotes that the password content is allowed to be valid once every specific days, the time of use of the password content also limits the single-day effective time, and then the single-day effective time limits the range of use in which it will be valid once. In other words, in addition to the limitation that the repetition interval is specific days, the time of use of the password content may also limit the single-day effective time of the use of the password content. "Every specific days" is used to limit the number of days as an interval, which may be, for example, one of one day to X days, where X is a natural number and the value of X is greater than or equal to 1. For the description of the single-day effective time, refer to the above description, which will not be repeated In some embodiments.

The following is the description of examples of the specific months, specific weeks and specific days as intervals mentioned above. For example, if the interval is specific months, the form of the time of use of the password content may be, but is not limited to, 7:00 to 17:00 on the 1st, 3rd, and 4th every two months. The time of use of the password content denotes that every 2 months, the password content can be used on the 1st, 3rd, and 4th, and the password content can be used for controlling the controlled device from 7:00 to 17:00 on the 1st, 3rd, and 4th. For example, if the generation time (e.g., a generation timestamp) is Oct. 12, 2018, the password content will be valid for the first time from 7:00 to 17:00 on 1, 3, and 4 Jan. 2019 (the so-called "be valid" means that the controlled device can be controlled based on the password content), for the second time from 7:00 to 17:00 on 1, 3, and 4 Mar. 2019, for the third time from 7:00 to 17:00 on 1, 3, and 4 May 2019 and so on, so that the effectiveness of the password content can be repeated periodically.

For example, if the interval is specific weeks, the form of the time of use of the password content may be, but is not limited to, 8:00 to 12:00 on Friday every 3 weeks. The time of use of the password content denotes that every 3 weeks, the password content can be used to control the controlled device from 8:00 to 12:00 on Friday. It depends on the generation timestamp on which Friday of the specific week it will be valid. For details, refer to the above description, which will not be explained here.

For another example, if the interval is specific days, the form of the time of use of the password content may be, but is not limited to, 13:00 to 19:00 every 5 days. The time of use of the password content denotes that every 5 days, the password content will be valid from 13:00 to 19:00. It also depends on the generation timestamp on which specific day it will be valid from 13:00 to 19:00. For details, refer to the above description, which will not be explained here.

It can be seen from the above examples that the time of use of the password content can contain information such as the repetition type, repetition period, repetition interval, start time and end time at the same time. The repetition type is used to denote that the password content is repeated in one of the following ways: months, weeks, and days. The repetition period is used to limit the date when it will be valid each time. For example, the repetition period is the 1st, 3rd, and 4th of each effective month for the 7:00 to 17:00 on the 1st, 3rd and 4th every 2 months mentioned above. The repetition interval limits the time interval between two adjacent times of taking effect. For example, 2 months in the above example is the repetition interval. The start time and end time are the beginning and end of the single-day effective time, respectively. The repetition type, repetition interval, etc. can be preset on the first electronic device, and the user selects the information that can be used as the information of the time of use of the password content entered this time from the preset repetition type, repetition interval and other information. Of course, the user can input the repetition type and repetition interval and other information. These will be described later in conjunction with the drawings.

In S302, the processor may generate and send a password based on the password content, the time of use of the password content, and the generation time, where the generation time is the password sending time, and the generation time is used to verify whether the password is within the range of the time of use in which it will be valid once when control is performed based on the password.

In some embodiments, the method of generating the password is: the password is composed of the password content, the time of use of the password content, and the generation time; specifically, the password content and the time of use of the password content are used as the first part of the password, and the first part of the password is sent to the second electronic device, and the sending time of the first part is recorded as the generation time, the generation time (e.g., a timestamp) is used as the second part of the password, and the second part of the password is sent to the second electronic device.

That is, although the password is composed of the password content, the time of use of the password content and the generation time, the generation time is the time when the password content and the time of use of the password content are sent, so that the parts of the password can be sent separately. For example, first the password content and the time of use of the password content are sent as the first part, and then the sending time of the first part is sent as the generation time. Alternatively, after triggering the sending of the password content and the time of use of the password content, wait for a preset time (depending on the actual application). And the time when the sending is triggered is used as the sending time of the first part. Thus, the generation time can be sent to the second electronic device along with the password content and the time of use of the password content.

In some embodiments, the generation time may be used to verify whether the time when the password was entered on the controlled device is within the range of the time of use in which the password is effective (or valid) once so that whether the password for controlling the controlled device is valid can be determined and periodic control of the controlled device may be realized using a password. Regarding how to verify it, more explanations will be made with reference to the drawings later.

In some embodiments, the processor may obtain a first working time of the preset periodic password. The preset periodic password may start to be valid for the first time at the first working time. In some embodiments, the first working time may be set by the user or may be set by the processor according to a default setting. In some embodiments, the first working time may be set as the same as the generation time of the periodic password. The first working time may be used to determine whether the time when the password was entered on the controlled device is within the range of the time of use in which the password is valid.

It can be seen from the above technical solution that after the password content is entered by the user (or acquired by an acquiring device) and the time of use of the password content entered by the user are acquired, a password is generated based on the password content, the time of use of the password content and the generation time, in which the time of use of the password content denotes that the password content is allowed to be valid once at a specific time interval, and limits the range of the time of use in which the password content will be valid once. This means that the password generated based on the password content is a periodic password, thereby adding another type of password on the basis of the existing permanent password and one-time password. Thus, it is possible to satisfy the user requirement of controlling the controlled device (for example, the second electronic device capable of communicating with the first electronic device) once at a specific time interval by this type of periodic password.

Figure 11:
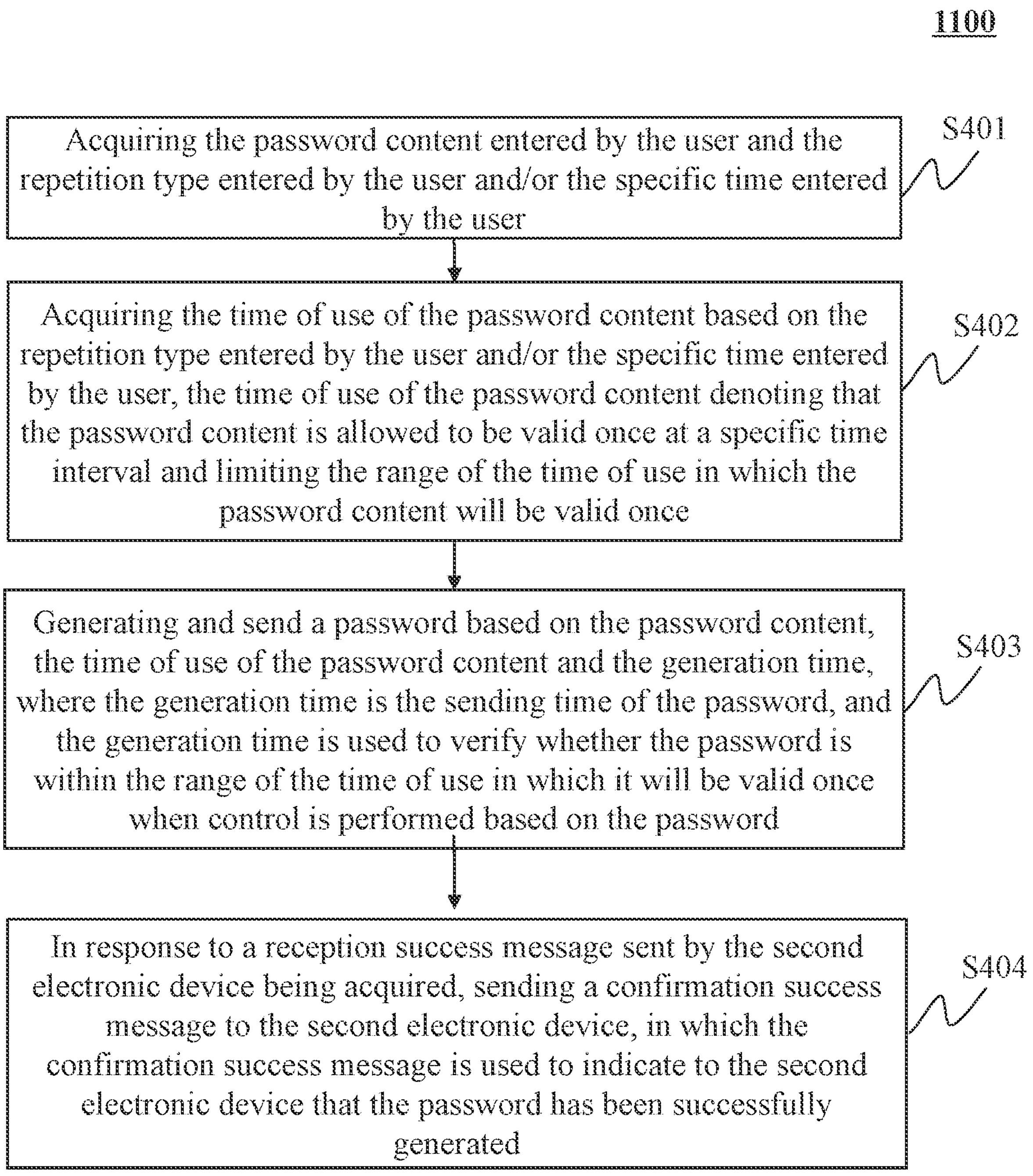
FIG. 11 is a flowchart of a password generation method provided by an embodiment of the present disclosure.

FIG. 11 shows another password generation method provided by an embodiment of the present disclosure, which is used to add the repetition type input by the user and/or the specific time input by the user into the password. The process is as shown in FIG. 11. The process 1100 is as shown in FIG. 11 and may include the following steps.

In S401, the processor may acquire the password content entered by the user (or acquired by an acquiring device) and the repetition type entered by the user and/or the specific time entered by the user.

In S402, the processor may acquire the time of use of the password content based on the repetition type entered by the user and/or the specific time entered by the user, the time of use of the password content denoting that the password content is allowed to be valid once at a specific time interval and limiting the range of the time of use in which the password content will be valid once.

user, the repetition period, start time and end time on which the acquisition of the time of use is based can also be input by the user, so that the repetition type, repetition interval, repetition period, start time and end time may be included the time of use of the password content. Refer to the foregoing method embodiment for the description of the repetition type, repetition interval, repetition period, start time, and end time, which will not be described.

The method for the user to enter the password content and time of use may be but is not limited to: displaying an interface in the display area of the first electronic device, which provides controls for entering the password content and time of use, so that the user can enter the password content and time of use through these controls. Of course, the password content and time of use can also be directly manually input by the user without the interface, or after a voice carrying the password content and time of use therein is acquired, the password content and time of use can be recognized from the voice, or an image containing the password content and the time of use can be collected by the first electronic device. This embodiment does not limit the input method of the password content and time of use.

In S403, the processor may generate and send a password based on the password content, the time of use of the password content and the generation time, where the generation time is the sending time of the password, and the generation time is used to verify whether the password is within the range of the time of use in which it will be valid once when control is performed based on the password.

Operation S403 may be performed in a manner similar to operation S302 in the execution process and principle, which will not be repeated here. Here, a brief description of the components of the password is provided. In some embodiments, the components of the password include: the password content, the time of use of the password content, and the generation time (e.g., a timestamp), in which the time of use of the password content includes: the repetition type, the repetition period, the repetition interval, the start time and the end time, as shown in Table 1, which gives explanation by taking the repetition by months as an example.

TABLE 1

| Time of use of password content and generation timestamp | | | | | |
|---|---|---|---|---|---|
| create_time | repeat_interval | repeat_period | end_hour | start_hour | repeat_type |
| 15 byte~12 byte | 11 byte | 10 byte~7 byte | 6 byte~4 byte | 3 byte~1 byte | bit1~bit0 |

The repetition type is used to denote that the password content is repeated in months, weeks, or days, so that the time of use of the password content is limited by the repetition type entered by the user and/or the specific time entered by the user. In this way, the user enters the repetition type and/or the specific time so that the user is enabled to freely and flexibly set the time of use.

In some embodiments, the specific time input by the user is the above repetition interval. For example, if the time of use of the password content is Wednesday every 4 weeks, the specific time is 4 weeks. The time of use of the password content is limited by the user input to satisfy the actual requirements for the time of use of the password content. In addition to the features of the repetition type and the specific time that denotes the repetition interval can be input by the As can be seen in Table 1, repeat_type is the repetition type, which uses the 2 bits bit 0 and bit 1 of byte 0 of the password; start_hour is the start time, which uses bytes 1-3 of the password; end_hour is the end time, which uses bytes 4-6 of the password; repeat_period is the repetition period, which uses bytes 7-10 of the password; repeat_interval is the repetition interval, which uses byte 11 of the password; and create_time is the generation timestamp, which uses bytes 12-15 of the password.

It can be seen from Table 1 that the password generated In some embodiments has been added with the time of use of the password content and the generation timestamp compared to the permanent password, and has been added with fields other than the start time and the end time compared to the one-time password. In actual applications, by adding each field shown in Table 1 after the password content, different types of passwords can be generated by the first electronic device. The specific password type depends on whether the contents of the fields shown in Table 1 are empty or not. If all are empty, it is a permanent password. If all are empty except for the start time and end time, it is a one-time password. And if each field is not empty, it is the type of password provided in some embodiments.

In addition to adding the fields shown in Table 1 after the password content to meet the requirements for different types of passwords, In some embodiments, a reserved field may also be added to meet the need to add information carried by the password later. In addition, for repeat_type, the following settings can also be used to limit whether the password is repeated by months, weeks, or days, such as:

01=pwd_repeat_day_type, which represents that the password is repeated by days;

10=pwd_repeat_week_type, which represents that the password is repeated by weeks;

11=pwd_repeat_month_type, which represents that the password is repeated by months.

When it is repeated by days, the range of the time of use in which it will be valid once includes: 1 day (indicating that the range of the time of use is within one day)+single-day effective time (including the start time and end time)+ password validity period (indicating the final time of use of the password; if the period expires, the password will become invalid; in practice, the password will be valid permanently by default), and the spaces used by these parts are 0 bits, 6 bytes, and 0 bits, respectively.

If it is repeated by weeks, the range of the time of use in which it will be valid once includes: multiple days of a week+single-day effective time+password validity period. The spaces used by these parts are 7 bits, 6 bytes, and 0 bits, respectively, and the 7 bits can be used to record whether it is effective from Monday to Sunday. Specifically, the specific day of a week on which it will be valid can be specified by the way of a preset numerical value. For example, the preset numerical value is 1. When one of the data of the 7 bits is 1, it means that the password will be effective on the day corresponding to that bit. For example, the data of the 7 bits corresponds to Monday to Sunday from 0 to 6 respectively, and if bit 3 in the 7-bit data is 1, it means that the password will be valid on Thursday.

If it is repeated by months, the range of the time of use in which it will be valid once includes: multiple numbers+ single-day effective time+password validity period. The spaces used by these parts are 32 bits, 6 bytes, and 0 bits, respectively. The 32 bits is used to record on which day of a month it will be valid. For details, refer to the description of repetition by months.

Here, it should be noted that if it is repeated by weeks, repeat_period uses byte 7 of the password, repeat_interval uses byte 8 of the password, and create_time uses bytes 9-12 of the password; if it is repeated by days, repeat_period uses bit 0 of byte 7 of the password, and the rest are the same as those of the repetition by weeks.

In S404, in response to a reception success message sent by the second electronic device being acquired, the processor may send a confirmation success message to the second electronic device, in which the confirmation success message is used to indicate to the second electronic device that the password has been successfully generated.

In some embodiments, the reception success message may be a notification that the second electronic device has received the information of the periodic password (e.g., the first part and the second part of the periodic password).

That is, after the first electronic device generates the preset periodic password, it needs to send the password online or offline to the second electronic device that is communicatively connected to the first electronic device. For example, if the first electronic device is a user terminal and the second electronic device is a door lock (e.g., the smart door lock 100) that is communicatively connected to the user terminal, the connection method between the two can be NFC, Bluetooth network connection, etc., or LAN, GPRS, ZigBee network, etc., and when the user terminal sends a password to the door lock, not only can the password be sent online through these connection methods, but also the generation and verification of the password can be done offline. When offline password transmission is conducted, an activation code or function code can be added to the beginning of the offline password generated by the user terminal to activate the related functions of the smart device, so that the user can control the state of the smart device, after adding a periodic password on the smart device. The specific contents and format of the activation code or function code can be selected depending on the actual situation, and are not limited to the embodiments of the present disclosure.

Specifically, after the first electronic device generates the password, the first electronic device and the second electronic device need to perform a handshake interaction, so as to indicate whether the password generated by the first electronic device can be used on the second electronic device through the handshake interaction. If a confirmation success message is sent to the second electronic device, it means that it can be used on the second electronic device, thereby indicating that the password has been successfully generated to the second electronic device, and the second electronic device can use the password. For example, the first electronic device is a terminal, and the second electronic device is a door lock, and a password is generated by the terminal and then sent to the door lock, thereby controlling the door lock based on the password, such as controlling the closing and opening of the door lock. The process of the handshake interaction between the first electronic device and the second electronic device is as follows:

After receiving the password, the second electronic device sends a reception success message to the first electronic device. The reception success message is used to indicate that the second electronic device has received the password and can correctly parse the password. That is, in actual applications, the first electronic device encrypts the password and then sends it to the second electronic device. For example, the first electronic device can use but is not limited to the AES (Advanced Encryption Standard) peer-to-peer encryption method to encrypt the password, and the first electronic device may employ, but is not limited to, BLE (Bluetooth Low Energy), Zigbee, and other communication protocols to interact with the second electronic device during handshake interaction.

The format of the reception success message can be negotiated in advance. For example, it can be expressed in but is not limited to the binary format. For example, 1 means successful reception, and 0 means a reception failure.

The first electronic device sends a confirmation success message to the second electronic device, and the confirmation success message is used to indicate that the password has been successfully generated to the second electronic device.

If the second electronic device sends a reception success message, the first electronic device may feed back a confirmation success message to the second electronic device at this time to indicate that the password can be used within the time of use, and after receiving the confirmation success message, the second electronic device encrypts and stores the password. For example, the second electronic device encrypts the password by obfuscating it, and then stores it.

If acquiring a reception failure message sent by the second electronic device, the first electronic device may send the password to the second electronic device multiple times, and if the reception failure message is still sent after the password has been sent the preset number of times, a preset operation will be performed. The preset operation may be sending a prompt message to indicate that the second electronic device is malfunctioning and/or the data interaction between the second electronic device and the first electronic device fails.

Here, it should be noted that the first electronic device can be used as a controlled device. That is, the first electronic device can not only generate a password, but also be controlled based on the password. Taking the door lock as the first electronic device as an example, a password is generated through the processor, display screen, camera, sound collection device, etc., of the door lock, and when the password is stored in the storage device of the door lock, the processor and the storage device perform the aforementioned handshake interaction to determine whether the generated password can be used (also be referred to as determine whether the user information passes a verification).

It can be seen from the above technical solution that after the password content input by the user and the repetition type input by the user and/or the specific time input by the user are acquired, the time of use of the password content is acquired based on the repetition type input by the user and/or the specific time input by the user; then, based on the password content, the time of use of the password content, and the generation timestamp, a password is generated and sent; if a reception success message sent by the second electronic device is acquired, a confirmation success message is sent to the second electronic device; thus, it can be confirmed that the second electronic device has accurately received the password by multiple handshake interactions between the first electronic device and the second electronic device; and it is notified that the password is effective (i.e., the user information passes the verification) by the multiple handshake interactions; thus, the security of the password is improved.

Figure 12:
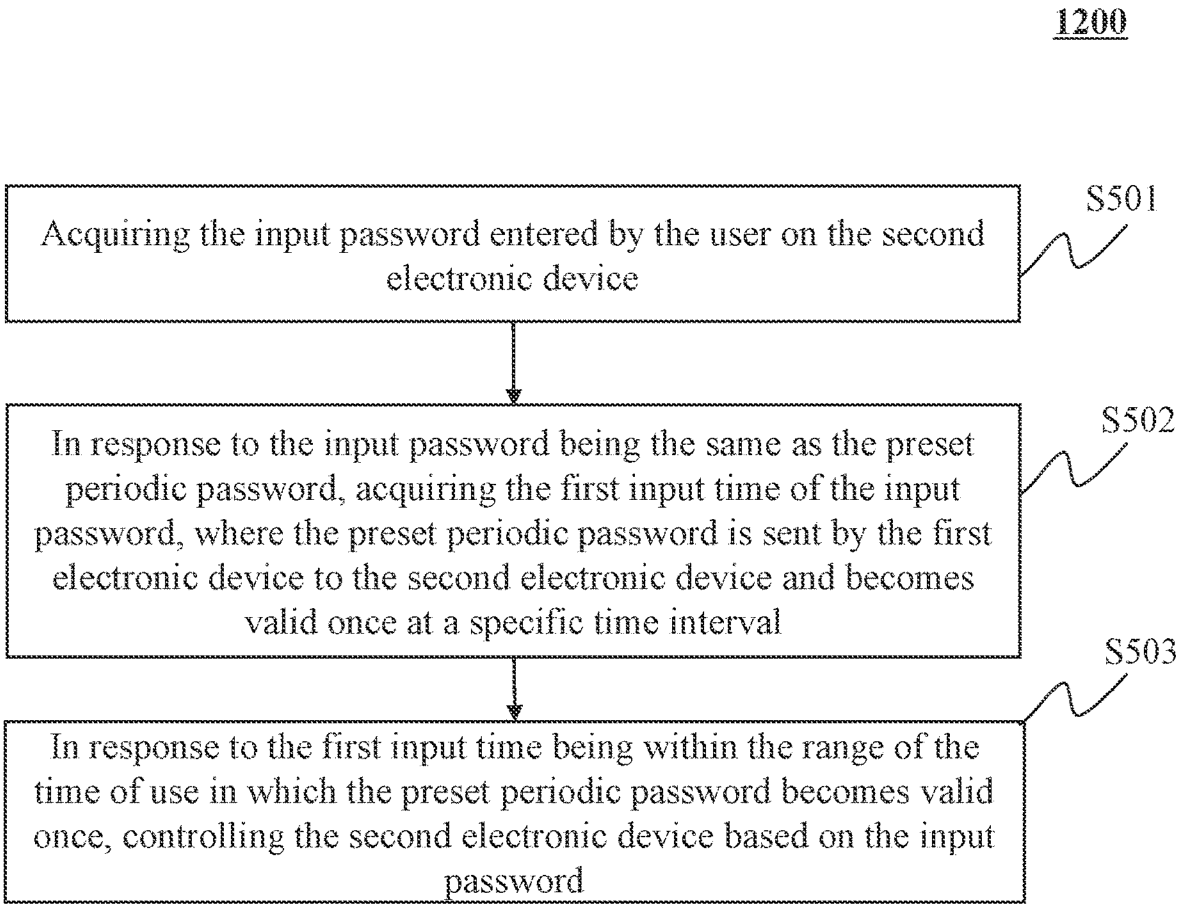
FIG. 12 is a flowchart of a password verification method provided by an embodiment of the present disclosure.

Next, taking the second electronic device (e.g., a smart device) as the controlled device, it is explained how to use the password having the time of use (i.e., the preset periodic password) generated by the first electronic device. The process 1200 is as shown in FIG. 12, which shows a password verification method provided by an embodiment of the present disclosure. The method may include the following steps.

In S501, the processor may acquire the input password entered by the user on the second electronic device.

The input password can be any of a number, a fingerprint, a sound, an image, etc., and the input password is the password that the user plans to use to control the second electronic device. The input method of the input password depends on the form of the input password. For example, the input password is a number in the above number, fingerprint, sound, image, etc., and then the input method of the input password can be any one of voice input, key input, and handwriting input. In some embodiments, the input methods of various forms of input passwords are not explained one by one.

In S502, in response to the input password being the same as the preset periodic password, the processor may acquire the first input time of the input password, where the preset periodic password is sent by the first electronic device to the second electronic device and becomes valid once at a specific time interval.

That is, the preset periodic password is generated in advance by the first electronic device and sent to the second electronic device, so that the second electronic device can be controlled based on the preset periodic password at a specific time interval, and the specific preset periodic password is the password that includes the password content and the time of use of the password content in the methods shown in FIGS. 9-11 above. The password content is used to verify the input password. If the content of the input password and the password content in the preset periodic password are the same, it means that the input password is the same as the preset periodic password.

The time of use of the password content is used to limit the password content in the preset periodic password to be valid once each time after a predetermined time has passed and limit the range of the time of use in which it will be valid once (for details, see the above embodiments). Therefore, if the input password and the preset periodic password are the same, it is needed to acquire the first input time of the input password to verify whether the input password is within the range of the time of use in which the preset periodic password becomes valid once. If it is within the range, it is indicated that the first input time can be used to control the second electronic device based on the preset periodic password.

In some embodiments, the processor may compare, based on the time of use of the preset periodic password, the input time with an effective time for the preset periodic password to obtain a comparison result; and in response to the comparison result that the input time is within the effective time for the preset password, the processor may determine to switch the state of the smart device based on the password content. For instance, the processor may determine which state of the smart device to be switched based on a password type corresponding to the password content, as described in operation S201.

The first input time of the input password is the time when the second electronic device acquires the input password, and this time is the local time of the second electronic device. For example, if the input password is acquired at 13:00 on Oct. 15, 2018, then the first input time is 13:00 on Oct. 15, 2018.

In S503, in response to the first input time being within the range of the time of use in which the preset periodic password becomes valid once, the processor may control the second electronic device based on the input password.

If the first input time is within the range of the time of use in which the preset periodic password becomes valid once, it means that not only the content of the input password is the same as the password content in the preset periodic password, but also the input password is at the time when the preset periodic password can be used. At this time, the second electronic device can be controlled based on the input password. The specific operations that control the second electronic device can be preset, and will not be described.

The method of verifying whether the first input time is within the range of the time of use in which the preset periodic password becomes valid once is as follows:

If the first input time is within the single-day effective time when it becomes valid once, verify whether the first input time is within the date/day of a week when it becomes valid once.

If the first input time is within the date/day of a week when it becomes valid once, verify whether the first input time meets an interval requirement of a specific time.

If the first input time meets the interval requirement of a specific time, it is determined that the first input time is within the range of the time of use in which the preset periodic password becomes valid once.

Refer to the above method embodiment for the description of the single-day effective time, date/day of a week, and specific time, which will not be described In some embodiments. Here, an example is used to describe the verification process. For example, the time of use of the password content in the preset periodic password is 8:00 to 17:00 on the 1st, 3rd, and 4th every 2 months and the generation timestamp of the preset periodic password is Oct. 12, 2018, and then the password content in the preset periodic password will be valid for the first time from 8:00 to 17:00 on Jan. 1, 3, and 4, 2019, for the second time from 8:00 to 17:00 on Mar. 1, 3, and 4, 2019, for the third time from 8:00 to 17:00 on May 1, 3, and 4, 2019, and so on.

If the first input time is 14:00 on Mar. 1, 2019, 14:00 is within the single-day effective time of 8:00 to 17:00, and the 1st is within the date of being once effective, and April also meets the interval requirement of the specific time. Thus, it can be determined that the first input time is within the range of the time of use in which the preset periodic password becomes valid once. If the first input time is 19:00 on Mar. 1, 2019 or Mar. 5, 2019 or April 2019, it is determined that the first input time is not within the range of the time of use in which the preset periodic password becomes valid once.

In some embodiments, verifying whether the first input time meets an interval requirement of a specific time needs to be based on the interval requirement denoting any of the months, weeks, and days as an interval, and the process is as follows:

If the interval requirement of the specific time denotes that it becomes valid once every X months, the months from the sending time of the preset periodic password (the sending time is the above-mentioned generation timestamp) to the first input time as an interval is acquired, and if the months as an interval can be exactly divided by X, it is determined that the first input time meets the interval requirement of the specific time, in which the calculation method of the months as an interval is: the month of the first input time+12*(the year of the first input time−the year of the generation timestamp)−the month of the generation timestamp; and X is a natural number greater than or equal to 1.

If the interval requirement of the specific time denotes that it becomes valid once every Y weeks or every Z days, the first timestamp at 0:00 on the day of the sending time of the preset periodic password (the sending time is the above-mentioned generation timestamp) and the second timestamp of the first input time are acquired, and the timestamp of the interval between the second timestamp and the first timestamp is also acquired. If the timestamp as the interval can be exactly divided by the timestamp indicated by Y weeks or Z days, it is determined that the first input time meets the interval requirement of the specific time. X, Y and Z are all natural numbers greater than or equal to 1.

Specifically, if the interval requirement of the specific time denotes that it becomes valid once every Y weeks, the first timestamp is the timestamp at 0:00 of the week indicated by the generation timestamp, and the timestamp of the interval between the second timestamp and the first timestamp is: the second timestamp−the first timestamp; if the interval requirement of the specific time denotes that it becomes valid once every Z days, the first timestamp is the timestamp at 0:00 of the generation timestamp, and the corresponding timestamp of the interval between the second timestamp and the first timestamp is: the second timestamp−the first timestamp.

In some embodiments, the processor may also determine a plurality of effective dates when the preset periodic password is valid. For example, the processor may determine the plurality of effective dates based on the predetermined time and the first working time (or the generation time) of the periodic password. The processor may further compare the input time of the first password information with the time range and the effective dates. If the input time is within the time range and is on one of the effective dates, the processor may determine that the input time of the first password information is within the time of use in which the periodic password is valid.

It should be noted that the preset periodic password has the above password validity period, but there is a situation where after the password validity period expires, the preset periodic password is still stored in the preset password library. Thus, after the input password is acquired, the processor may compare the first input time of the input password with the password validity period, and if the first input time exceeds the password validity period, it is forbidden to control the second electronic device based on the input password.

It can be seen from the above technical solution that if the acquired input password is the same as the preset periodic password, the first input time of the input password is acquired, and if the first input time is within the range of the time of use in which the preset periodic password becomes valid once, then the first electronic device is controlled based on the input password, in which the preset periodic password becomes valid once at a specific time interval, and if the acquired input password is the same as the preset periodic password, it means that the acquired input password is a periodic password, and then if it is needed to periodically control the first electronic device based on a periodic password, the same specific time of the preset periodic password can be set, so that the user requirement of controlling the second electronic device once at a specific time interval is satisfied by this periodic password.

Figure 13:
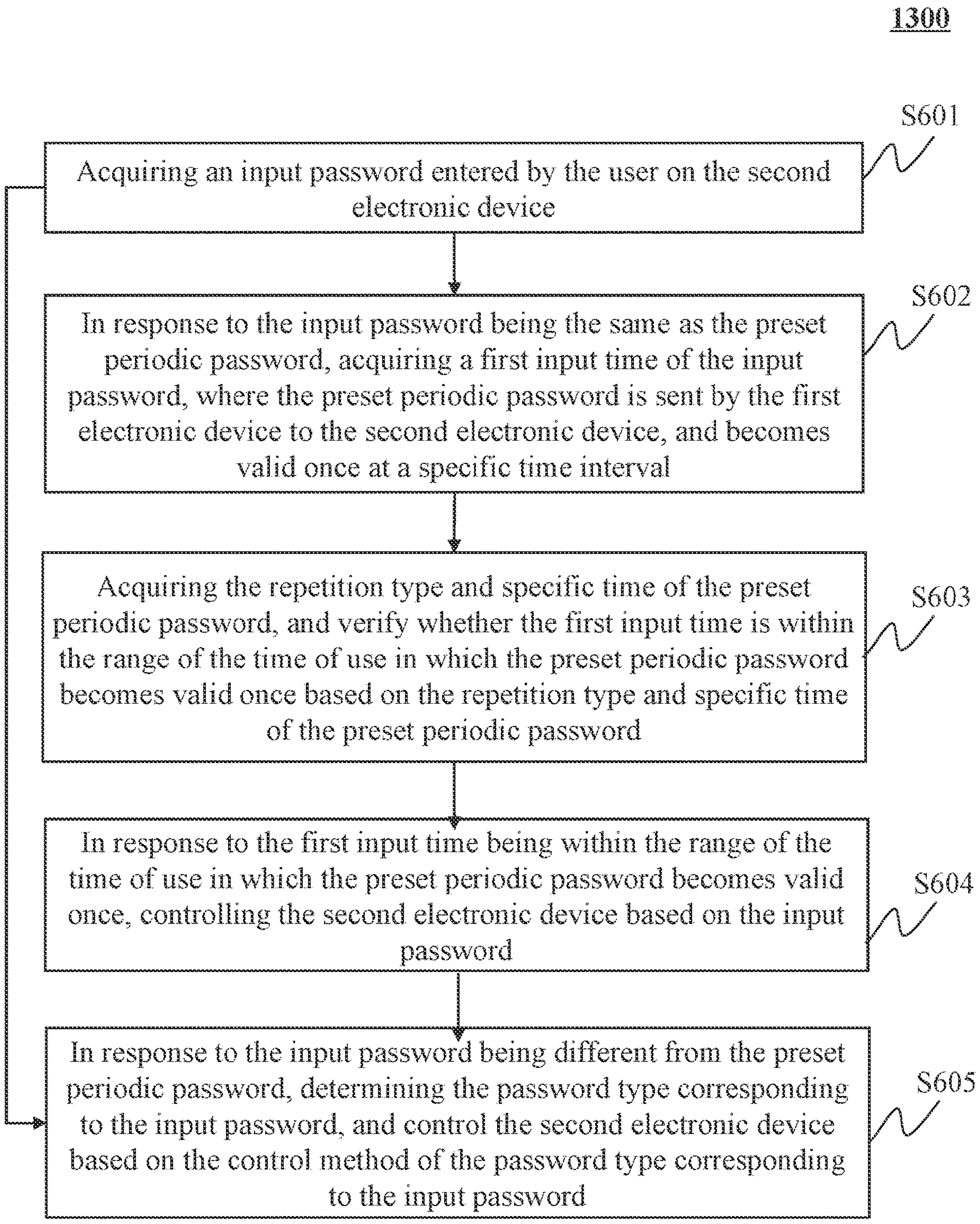
FIG. 13 is a flowchart of a password verification method provided by an embodiment of the present disclosure.

FIG. 13 shows a password verification method provided by an embodiment of the present disclosure, which describes verifying whether the first input time is within the range of the time of use in which the preset periodic password becomes valid once. The process 1300 is as shown in FIG. 13 and may include the following steps.

In S601, the processor may acquire an input password; the input password is a password entered by the user on the second electronic device.

In S602, in response to the input password being the same as the preset periodic password, the processor may acquire a first input time of the input password, where the preset periodic password is sent by the first electronic device to the second electronic device, and becomes valid once at a specific time interval.

The principles of the execution processes of the above-mentioned S601 and S602 are the same as those of the above-mentioned S501 and S502, and will not be repeated here.

In S603, the processor may acquire the repetition type and specific time of the preset periodic password, and verify whether the first input time is within the range of the time of use in which the preset periodic password becomes valid once based on the repetition type and specific time of the preset periodic password.

The repetition type is used to indicate that the password content in the preset periodic password is valid repeatedly periodically by one of months, weeks, and days. If taking effect repeatedly periodically by one of months, weeks and days is adopted, the processor may verify whether it is within the range of the time of use in which the preset periodic password becomes valid once based on the specific time. Refer to the foregoing method embodiment for the specific process, which will not be described here.

In S604, in response to the first input time being within the range of the time of use in which the preset periodic password becomes valid once, the processor may control the second electronic device based on the input password.

The execution process and principle are the same as those of the foregoing S503, and will not be repeated here. And if the first input time is not within the range of the time of use in which the preset periodic password becomes valid once, it is forbidden to control the second electronic device based on the input password.

In S605, in response to the input password being different from the preset periodic password, the processor may determine the password type corresponding to the input password, and control the second electronic device based on the control method of the password type corresponding to the input password.

In some embodiments, the method of determining the password type corresponding to the input password is to compare the content of the input password with the contents of different types of passwords in the preset password library; if the content of the input password is the same as the content of the preset permanent password in the preset password library, determine that the password type corresponding to the input password is permanent, which means that the input password is a permanent password; if the content of the input password is the same as the content of the preset one-time password in the preset password library, determine that the password type corresponding to the input password is one-time, which means that the input password is a one-time password, in which the preset password library is a database storing different types of passwords, and the preset permanent password and the preset one-time password are both sent by the first electronic device to the second electronic device.

After determining the password type corresponding to the input password, the process of controlling the second electronic device based on the control method of the password type is as follows: if the input password is the same as the preset permanent password, control the second electronic device based on the input password. The specific operations of controlling the second electronic device can be determined according to the actual application.

If the input password is the same as the preset one-time password, a second input time of the input password is acquired. If the second input time is within the range of the time of use of the preset one-time password, the second electronic device is controlled based on the input password. That is, the second electronic device can be controlled only if it is within the range of the time of use of the preset one-time password, and the range of the time of use of the preset one-time password includes the start time and the end time, which will not be described.

It can be seen from the above technical solution that if the input password is the same as the preset periodic password, the repetition type and specific time of the preset periodic password are acquired, and based on the repetition type and specific time of the preset periodic password, it is verified whether the first input time is within the range of the time of use in which the preset periodic password becomes valid once, so that the second electronic device is controlled by the preset periodic password within the range of the time of use in which the periodic password becomes valid once; if it is determined that the input password is different from the preset periodic password, it is determined whether the input password is a preset permanent password or a preset one-time password, so that control can be performed based on one of the preset permanent password and the preset one-time password. Thus, multiple types of passwords can be used to control the second electronic device, which improves the flexibility of control to better meet the needs of users.

In addition, the password verification method provided in some embodiments may further include: deleting an expired preset periodic password, and/or if an instruction to delete a periodic password is acquired, deleting the preset periodic password pointed to by the instruction.

One feasible way to delete an expired preset periodic password is to acquire the local time (the current time of the second electronic device) and the password validity period of a preset periodic password; if the local time exceeds the password validity period of the preset periodic password, delete the preset periodic password. For example, if the password validity period of a preset periodic password is 2018 Oct. 15-2018 Nov. 15 but the local time is 2018 Nov. 16, it means that the preset periodic password has expired, and the preset periodic password will be deleted.

One feasible way to acquire an instruction to delete a preset periodic password is to acquire an instruction to delete a preset periodic password issued by the user through the first electronic device, which carries the preset periodic password that the user wants to delete therein. The preset periodic password that the user wants to delete is the password pointed to by the instruction. Another way is: if the local time exceeds the password validity period of a preset periodic password, it means the preset periodic password has expired, and the second electronic device will automatically generate an instruction to delete the preset periodic password, and the preset periodic password pointed to by the instruction is the expired preset periodic password.

It can be seen from the above technical solution that by deleting the expired preset periodic password, the expired preset periodic password can no longer be used to control the second electronic device after the deletion, which improves the security, and by acquiring the instruction to delete a periodic password to delete the preset periodic password pointed to by the instruction, the unwanted preset periodic password can be deleted according to the user's wishes, so that the needs of users are better met.

The password verification method in the foregoing embodiment may further include: reading the preset periodic password from a first storage space, the first electronic device storing the preset periodic password in the first storage space after receiving the preset periodic password; and storing the preset periodic password in a second storage space in the form of a two-dimensional array, and the reading speed of the first storage space being lower than that of the second storage space, so as to read the preset periodic password from the second storage space when verifying the input password, thereby speeding up the speed of acquiring the preset periodic password.

In some embodiments, each element in the two-dimensional array is a field in the preset periodic password. For example, the preset periodic password includes the fields as shown in Table 1 and the password content. The number of the corresponding elements in the two-dimensional array is related to the fields in the preset periodic password and the bytes used by the fields, so as to store the fields in the preset periodic password into the elements of the two-dimensional array. Taking the repetition by months as an example, if it is assumed that the preset periodic password is the i-th preset periodic password received by the second electronic device, the fields in Table 1 are represented by a two-dimensional array as follows:

repeat_type=pwd_period[i−1][0]&0x03, &0x03 is due to the use of only bit 1~bit 0 of one byte by repeat_type;

start_hour, which represents the start time and is a string of characters, and uses 3 bytes; if one byte is represented using an element in the two-dimensional array, the representation of start_hour needs 3 elements in the two-dimensional array, for example:

The corresponding range of values of start_hour is pwd_period[i−1][1]-pwd_period[i−1][3];

This also applies for end_hour, repeat_period and repeat_interval, which have the following corresponding ranges of values respectively: pwd_period[i−1] [4]-pwd_period[i−1][6], pwd_period[i−1] [7]-pwd_period[i−1] [10], and pwd_period[i−1] [11];

create_time, which is an integer, and is calculated as follows:

create_time=(pwd_period[i−1][12]<<24);

create_time+=(pwd_period[i−1][13]<<16);

create_time+=(pwd_period[i−1][14]<<8);

create_time+=(pwd_period[i−1][15]]).

The maximum value of i is N, and N is the total number of preset periodic passwords allowed to be received. In addition, In some embodiments, the password verification method may also provide at least one password modification interface, and the at least one password modification interface is used to modify the preset periodic password, such as adding a preset periodic password and changing a preset periodic password. Changing a preset periodic password includes but is not limited to: changing the content of any field in the preset periodic password. In addition to modifying the preset periodic password, the password modification interface can also be used to change at least one of the preset permanent password and the preset one-time password, which is not described In some embodiments.

For the foregoing method embodiments, for the sake of simple description, they are all expressed as a combination of a series of actions, but those skilled in the art should know that the present disclosure is not limited by the described sequence of actions, because according to the present disclosure, some steps can be performed in other orders or at the same time. Secondly, those skilled in the art should also know that the embodiments described in the specification are all preferred embodiments, and the actions and modules involved are not necessarily required by the present disclosure.

The basic concepts have been described above. Obviously, for those skilled in the art, the detailed disclosure is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products or combinations of materials, or any new and useful improvements to them. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be called "data block", "module", "engine", "unit", "component" or "system". In addition, aspects of the present disclosure may appear as a computer product located in one or more computer-readable media, the product including computer-readable program code.

Computer storage media may contain a transmitted data signal containing a computer program code, such as on baseband or as part of a carrier wave. The propagation signal may have multiple manifestations, including electromagnetic form, optical form, etc., or a suitable combination form. A computer storage medium may be any computer-readable medium other than a computer-readable storage medium, which may be connected to an instruction execution system, device, or device to enable communication, propagation, or transmission of a program for use. The program code located on a computer storage medium may be transmitted through any suitable medium, including radio, cable, fiber optic cable, RF, or similar media, or any combination of the media.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters configured to illustrate the broad scope of some embodiments of the present disclosure are approximations, the numerical values in specific examples may be as accurate as possible within a practical scope.

Each patent, patent application, patent application publication and other materials cited herein, such as articles, books, instructions, publications, documents, etc., are hereby incorporated by reference in their entirety. Application history documents that are inconsistent or conflicting with the contents of the present disclosure are excluded, and documents (currently or later attached to the present disclosure) that limit the widest range of the scope of the present disclosure are also excluded. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the present disclosure are merely illustrative of the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, embodiments of the present disclosure are not limited to the embodiments that are expressly introduced and described herein.

What is claimed is:

1. A system, comprising:

at least one storage device storing executable instructions for controlling a smart door lock; and at least one processor in communication with the at least one storage device, wherein when executing the executable instructions, the at least one processor is configured to cause the system to perform operations including:

obtaining an unlocking instruction, wherein the unlocking instruction includes first password information;

obtaining information of a preset periodic password related to the smart door lock, wherein the preset periodic password becomes valid after a predetermined time has passed;

determining whether to unlock the smart door lock based on the first password information and the information of the preset periodic password;

in response to the determination to unlock the smart door lock, controlling the smart door lock to perform an unlock operation;

determining whether a door on which the smart door lock is installed has a preset action within a preset time period; and in response to the determination that the door has the preset action within the preset time period, controlling at least one component of the smart door lock to perform at least one operation.

2. The system of claim 1, wherein the information of the preset periodic password includes a time of use indicating the predetermined time and a time range in which the preset periodic password is valid.

3. The system of claim 2, wherein the determining whether to unlock the smart door lock based on the first password information and the information of the preset periodic password includes:

comparing the first password information with the preset periodic password information to obtain a first comparison result;

in response to the first comparison result that a password content of the first password information is the same as a password content of the preset periodic password, acquiring an input time of the first password information;

comparing, based on the time of use of the preset periodic password, the input time with an effective time for the preset periodic password to obtain a second comparison result; and in response to the second comparison result that the input time is within the effective time for the preset periodic password, unlocking the smart door lock based on the password content.

4. The system of claim 3, wherein the information of the preset periodic password includes a first working time and an effective period, wherein:

the preset periodic password starts to be valid for the first time at the first working time, and the preset periodic password is invalid outside the effective period.

5. The system of claim 4, wherein the predetermined time relates to specific weeks and a weekday number, the weekday number indicating one or more days within each week, wherein the preset periodic password becomes valid, during the time range on one or more days corresponding to the weekday number, each time after the specific weeks have passed; and the comparing the input time with the effective time of the preset periodic password to obtain the second comparison result includes:

determining whether the input time conforms to the weekday number;

in response to determining that the input time conforms to the weekday number, determining whether the input time conforms to the periodic time interval; and in response to determining that the input time conforms to the periodic time interval, obtaining the second comparison result that the input time is within the effective time for the preset periodic password.

6. The system of claim 5, wherein the determining whether the input time conforms to the periodic time interval includes:

determining a time difference between the first working time of the preset periodic password and the input time;

determining a count of target weeks included in the time difference;

determining a count of reference weeks in the periodic time interval;

determining whether the count of target weeks is divisible by the count of reference weeks; and in response to determining that the count of target weeks is divisible by the count of reference weeks, determining that the input time conforms to the periodic time interval.

7. The system of claim 4, wherein the predetermined time relates to specific months and a day number, the day number indicating one or more specific days within each month, wherein the preset periodic password becomes valid, during the time range on one or more days corresponding to the day number, each time after the specific months have passed; and the comparing the input time with the effective time of the preset periodic password to obtain the second comparison result includes:

determining whether the input time conforms to the day number;

in response to determining that the input time conforms to the day number, determining whether the input time conforms to the periodic time interval; and in response to determining that the input time conforms to the periodic time interval, obtaining the second comparison result that the input time is within the effective time for the preset periodic password.

8. The system of claim 7, wherein the determining whether the input time conforms to the periodic time interval includes:

determining a time difference between the first working time of the preset periodic password and the input time;

determining a count of target months included in the time difference;

determining a count of reference months in the periodic time interval;

determining whether the count of target months is divisible by the count of reference months; and in response to determining that the count of target months is divisible by the count of reference months, determining that the input time conforms to the periodic time interval.

9. The system of claim 1, wherein the preset action includes at least one of an opening action, a closing action, or a holding action.

10. The system of claim 9, wherein the determining whether the door on which the smart door lock is installed has a preset action within a preset time period comprises:

acquiring, by one or more sensors, sensor information of the door; and determining whether the door has the preset action within the preset time period according to the sensor information.

11. The system of claim 10, wherein the one or more sensors include a geomagnetic sensor and a magnet, wherein the geomagnetic sensor is installed on a door panel of the door and the magnetic is installed on any part of a door frame of the door.

12. The system of claim 11, wherein the determining whether the door has the preset action within the preset time period according to the sensor information includes:

obtaining a distance between the geomagnetic sensor and the magnet at each time point within the preset time period;

obtaining a magnetic field or magnetic field direction detected by the geomagnetic sensor at each time point; and determining whether the door has the preset action within the preset time period based on a changing trend of the magnetic field or the magnetic field direction according to the distance.

13. The system of claim 10, wherein the one or more sensors include a gyroscope sensor, an accelerometer, and a geomagnetic sensor.

14. The system of claim 13, wherein the determining whether the door has the preset action within the preset time period according to the sensor information includes:

determining an angle of the door at each time point within the preset time period based on an angular velocity detected by the gyroscope sensor; and determining whether the door has the preset action within the preset time period based on a changing trend of the angle of the door.

15. The system of claim 14, wherein the preset action is a holding action and the controlling at least one component of the smart door lock to perform at least one operation includes:

controlling the gyroscope sensor to enter a sleep mode;

controlling the geomagnetic sensor to enter the sleep mode or a low-power mode; and controlling the accelerometer to enter a low-power mode.

16. The system of claim 15, wherein the at least one processor is configured to cause the system to perform further operations including:

in response to determining that the door moves again, generating a wake signal based on acceleration information acquired by the accelerometer; and controlling the gyroscope sensor and the geomagnetic sensor to enter a high-power mode based on the wake signal.

17. The system of claim 16, wherein the at least one processor is configured to cause the system to perform further operations including:

correcting an angle of the door acquired by the gyroscope sensor at a start time point when the door moves again based on an angle acquired by the geomagnetic sensor.

18. The system of claim 9, wherein the preset action is an opening action or a closing action and the controlling at least one component of the smart door lock to perform at least one operation includes:

controlling the smart door lock to perform a lock operation.

19. A method implemented on a computing apparatus including a processor and a storage device for controlling a smart door lock, the method comprising:

obtaining an unlocking instruction, wherein the unlocking instruction includes first password information;

obtaining information of a preset periodic password related to the smart door lock, wherein the preset periodic password becomes valid after a predetermined time has passed;

determining whether to unlock the smart door lock based on the first password information and the information of the preset periodic password;

in response to the determination to unlock the smart door lock, controlling the smart door lock to perform an unlock operation;

determining whether a door on which the smart door lock is installed has a preset action within a preset time period; and in response to the determination that the door has the preset action within the preset time period, controlling at least one component of the smart door lock to perform at least one operation.

20. A non-transitory readable medium, comprising at least one set of instructions, wherein when executed by at least one processor, the at least one set of instructions directs the at least one processor to perform a method, the method comprising:

obtaining an unlocking instruction, wherein the unlocking instruction includes first password information;

obtaining information of a preset periodic password related to the smart door lock, wherein the preset periodic password becomes valid after a predetermined time has passed;

determining whether to unlock the smart door lock based on the first password information and the information of the preset periodic password;

in response to the determination to unlock the smart door lock, controlling the smart door lock to perform an unlock operation;

determining whether a door on which the smart door lock is installed has a preset action within a preset time period; and in response to the determination that the door has the preset action within the preset time period, controlling at least one component of the smart door lock to perform at least one operation.

* * * * *